US009729051B2

(12) United States Patent
Gao et al.

(10) Patent No.: US 9,729,051 B2
(45) Date of Patent: Aug. 8, 2017

(54) POWER CONTROL CIRCUIT, ENVIRONMENTAL POWER GENERATION DEVICE, AND CONTROL METHOD OF ENVIRONMENTAL POWER GENERATION DEVICE

(71) Applicant: FUJITSU LIMITED, Kawasaki-shi, Kanagawa (JP)

(72) Inventors: Hong Gao, Inagi (JP); Hiroyuki Nakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 14/976,959

(22) Filed: Dec. 21, 2015

(65) Prior Publication Data
US 2016/0226381 A1 Aug. 4, 2016

(30) Foreign Application Priority Data

Jan. 29, 2015 (JP) .................................. 2015-016054
Jun. 26, 2015 (JP) .................................. 2015-129070

(51) Int. Cl.
*G05F 1/56* (2006.01)
*H02M 3/156* (2006.01)
*H02M 1/00* (2006.01)

(52) U.S. Cl.
CPC .......... *H02M 3/1563* (2013.01); *G05F 1/562* (2013.01); *H02M 2001/0025* (2013.01)

(58) Field of Classification Search
None
See application file for complete search history.

(56) References Cited

U.S. PATENT DOCUMENTS

| 5,721,511 A * | 2/1998 | Lee ...................... H03K 3/0231 318/59 |
| 5,977,756 A * | 11/1999 | Nagata ................. H03K 17/063 323/282 |
| 2011/0273155 A1* | 11/2011 | Weir ..................... H02M 3/156 323/283 |
| 2013/0082742 A1* | 4/2013 | Ren ........................ H03K 17/30 327/81 |
| 2016/0181915 A1* | 6/2016 | Pan .......................... G05F 1/59 323/282 |

FOREIGN PATENT DOCUMENTS

| JP | 08-500218 A | 1/1996 |
| WO | WO 93/23925 A1 | 11/1993 |

* cited by examiner

*Primary Examiner* — Jeffrey Gblende
(74) *Attorney, Agent, or Firm* — Arent Fox LLP

(57) ABSTRACT

A power control circuit includes: a differential voltage monitor configured to monitor a differential voltage between a first voltage and a second voltage, and control a switching element to be turned on and off, wherein the differential voltage monitor controls the switching element in such a manner that in a case where the differential voltage is increased, when the differential voltage is lower than a first reference voltage, the switching element is turned off, and when the differential voltage is equal to or higher than the first reference voltage, the switching element is turned on, and in a case where the differential voltage is decreased, when the differential voltage is higher than a second reference voltage, the switching element is turned on, and when the differential voltage is equal to or lower than the second reference voltage, the switching element is turned off.

20 Claims, 35 Drawing Sheets

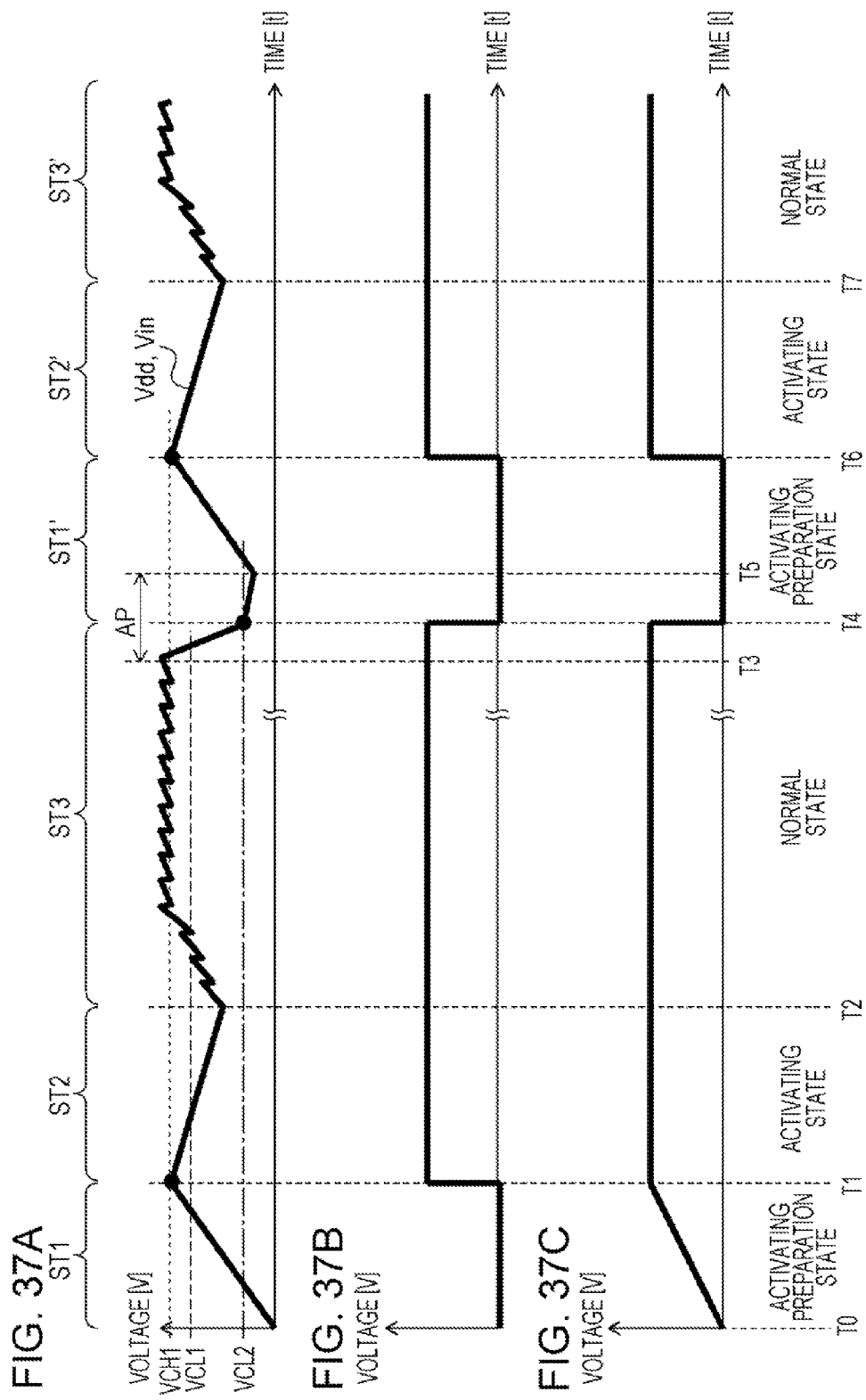

POWER CONTROL CIRCUIT, ENVIRONMENTAL POWER GENERATION DEVICE, AND CONTROL METHOD OF ENVIRONMENTAL POWER GENERATION DEVICE

CROSS-REFERENCE TO RELATED APPLICATIONS

This application is based upon and claims the benefit of priority of the prior Japanese Patent Application No. 2015-016054, filed on Jan. 29, 2015 and the prior Japanese Patent Application No. 2015-129070, filed on Jun. 26, 2015, the entire contents of which are incorporated herein by reference.

FIELD

The embodiments discussed herein are related to a power control circuit, an environmental power generation device, and a control method of the environmental power generation device.

BACKGROUND

In recent years, for example, energy harvesting for obtaining power by collecting sunlight or illumination light, electromagnetic waves, or energy such as vibration and heat from a machine and a human body has attracted attentions. An energy harvesting technique is expected to be applied to, for example, a wireless sensor network (WSN) in which a plurality of wireless sensors are disposed, and into which information from each of the wireless sensors are collected.

That is, when using power through energy harvesting as a power source of a wireless sensor node which is equipped with a sensor for measuring various types of data items such as temperature and humidity, a battery does not have to be exchanged.

Meanwhile, in the related art, as a power control circuit of the environmental power generation device, various types of circuits have been proposed.

Japanese National Publication of International Patent Application No. 08-500218 is an example of related arts.

SUMMARY

According to an aspect of the invention, a power control circuit includes: a first electrode to which a first voltage is applied; a second electrode to which a second voltage different from the first voltage is applied; a capacitor connected between the first electrode and the second electrode; a first switching element arranged between the first electrode and the second electrode and connected to a load in series; and a differential voltage monitor configured to monitor a differential voltage between the first voltage and the second voltage, and control the first switching element to be turned on and off, wherein the differential voltage monitor controls the first switching element in such a manner that in a case where the differential voltage is increased, when the differential voltage is lower than a first reference voltage, the first switching element is turned off, and when the differential voltage is equal to or higher than the first reference voltage, the first switching element is turned on, and in a case where the differential voltage is decreased, when the differential voltage is higher than a second reference voltage, the first switching element is turned on, and when the differential voltage is equal to or lower than the second reference voltage, the first switching element is turned off.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 37A to FIG. 37C are timing charts for illustrating an operation of the power control circuit in the environmental power generation device illustrated in FIG. 36;

DESCRIPTION OF EMBODIMENTS

As a power source of a wireless sensor node, it has been proposed to use the power by the energy harvesting. The wireless sensor node performs an intermittent operation, for example, the wireless sensor node is in an operation state (an active state) only when transmitting and receiving signals to and from a base station, but otherwise is in a low power consumption state (a sleep state).

However, an output power from an environmental power generator (Energy Harvester) which supplies the power through the energy harvesting is very small, and it is not easy to obtain a stable power. In addition, a power control circuit which suppresses generation of chattering by providing a comparator, a switching element, a power source filter, and the like, and thereby to output the stable power has been proposed; however, there are some problems in that a space utilized by the circuit is increased and a load is to be provided with a dedicated pin for controlling the power source.

First, examples of the power control circuit and the environmental power generation device and the problems will be described with reference to FIG. 1 to FIG. 9 before specifically describing a power control circuit, an environmental power generation device, and a control method of an environmental power generation device in the present embodiments.

In addition, in the present specification, as the environmental power generation device to which the power control circuit is applied, an energy harvester using a solar cell will be described as an example; needless to say, application in the embodiments is not limited to the energy harvester using a solar cell.

Figure 1:
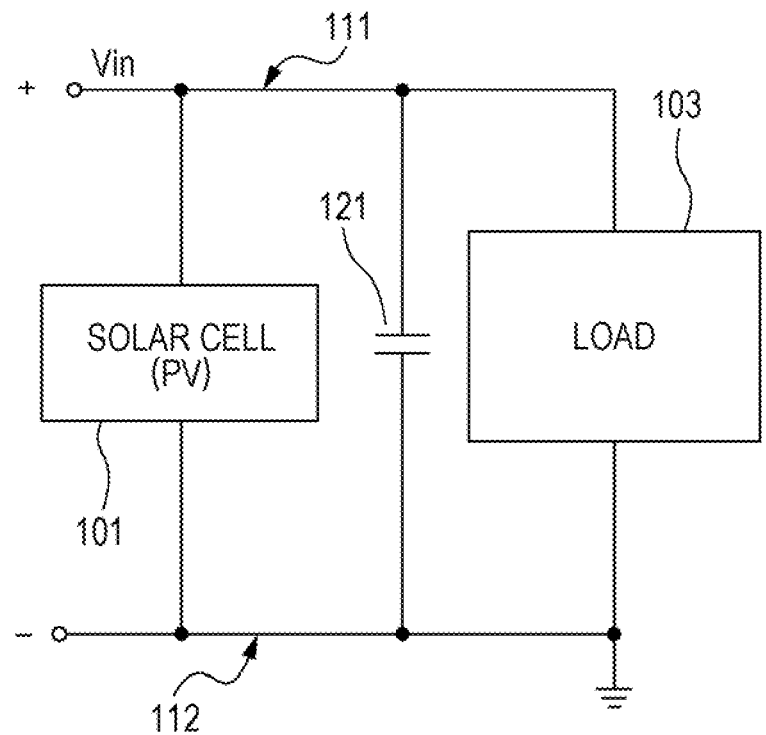
FIG. 1 is a diagram schematically illustrating an environmental power generation device.
Figure 2:
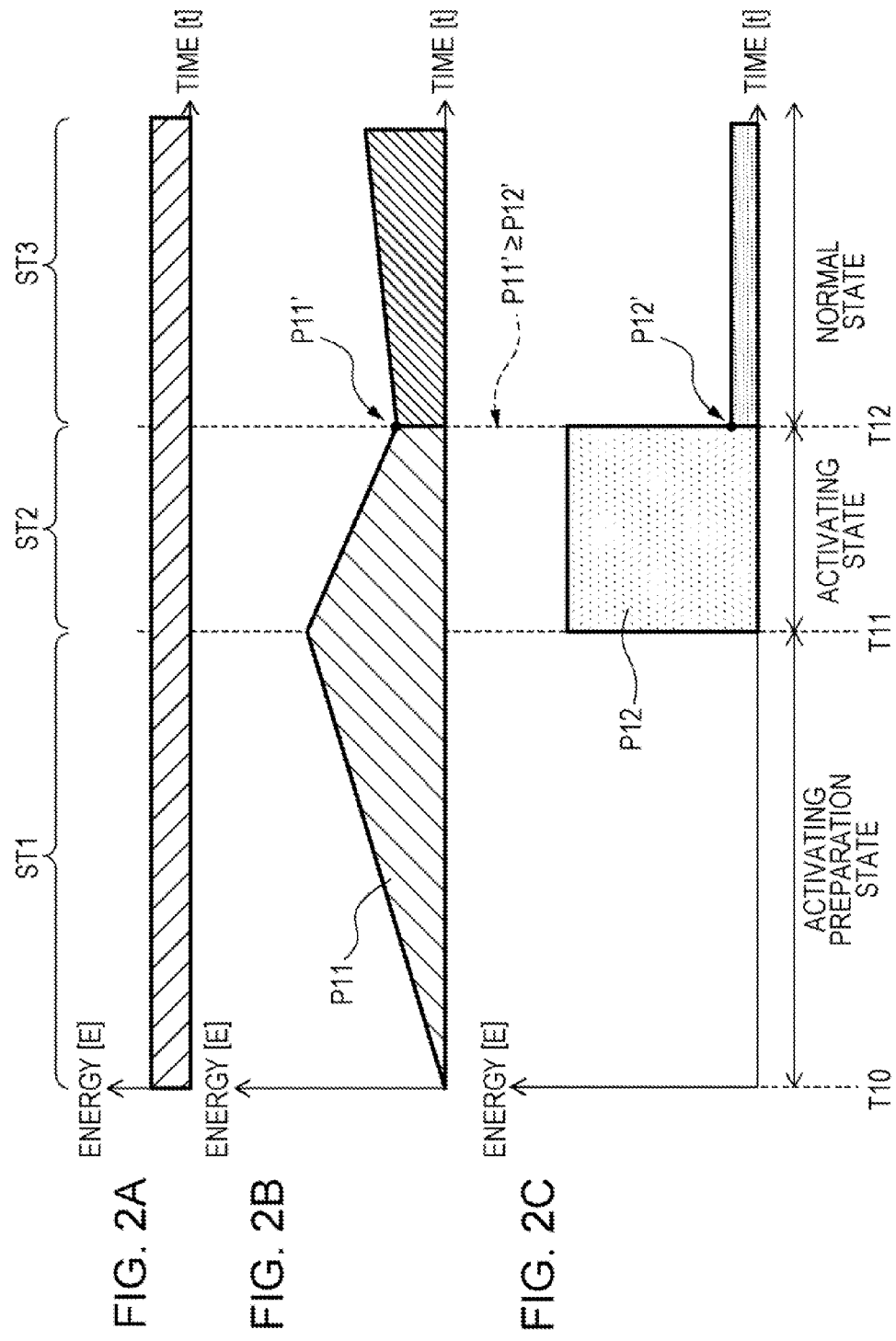
FIG. 2A to FIG. 2C are diagrams for illustrating an operation of the environmental power generation device illustrated in FIG. 1.

FIG. 1 is a diagram schematically illustrating an environmental power generation device. As illustrated in FIG. 1, the environmental power generation device includes, for example, an environmental power generator (energy harvester) 101 such as a solar cell and a capacitor 121 which accumulated s power from the solar cell 101, and supplies the power to a load 103.

That is, the capacitor 121 and the load 103 are provided in parallel between a high potential side power source line 111 and a low potential side power source line 112 of the solar cell 101, and the load 103 is driven by the power accumulated in the capacitor 121.

Note that, in the following description, the solar cell 01 which converts light energy such as sunlight or illumination light into a direct power by using a photovoltaic effect will be described as an example of the energy harvester; however, the energy harvester is not limited to the solar cell. In addition, the solar cell 101 is referred to as photovoltaics (PV) in some cases.

That is, in addition to the photovoltaic generator using light energy, for example, a vibration power generator or a heat generator which use vibration and heat from a machine and a human body, or an electromagnetic wave generator using electromagnetic wave energy can be applied to as the energy harvester.

In addition, a micro-voltage (for example, approximately in a range of several tens my to several hundred my) which is obtained from the solar cell 101 is boosted by, for example, the DC-DC converter (not illustrated), and the boosted voltage (for example, approximately several tens V) may be applied to the load 103.

Further, it is needless to say that from a wireless terminal (wireless sensor node) of a wireless sensor network, various types of electronic circuits or electronic devices are applicable to the load 103.

The environmental power generation device illustrated in FIG. 1 is configured such that for example, the power from the solar cell 101 which is thin and flexible is accumulated in the capacitor 121, and the load 103 is driven by the power accumulated in the capacitor 121.

In this way, when driving the load 103 by using the environmental power generation device including the solar cell 101 and the capacitor 121, batteries do not have to be exchanged. In addition, it is possible to form the environmental power generation device to be thin and flexible by using the solar cell which is thin and flexible as the energy harvester.

FIG. 2A to FIG. 2C are diagrams for illustrating an operation of the environmental power generation device illustrated in FIG. 1. Here, FIG. 2A illustrates power generation energy of the solar cell 101 with time, FIG. 2B illustrates energy stored (accumulated) in the capacitor 121 with time, and FIG. 2C illustrates energy consumption of the load 103 with time.

In addition, in FIG. 2A to FIG. 2C, a vertical axis represents energy (E) and a horizontal axis represents time (t). Further, T10 represents an energy accumulating start time of starting to accumulate the energy from the solar cell 101 in the capacitor 121, T11 represents an activating start time of starting to activate the load 103, and T12 represents a normal state start time of starting a normal state by activating the load 103.

In addition, ST1 represents an activating preparation state from the energy accumulating start time T10 to activating start time T11, ST2 represents an activating state from the activating start time T11 to the normal state start time T12, and ST3 represents a normal state after the normal state start time T12.

As illustrated in FIG. 2A, the solar cell 101 continuously receives, for example, uniform light energy, and continuously outputs uniform power generation energy (for example, several hundred (µJ)) regardless of the time course. That is, the solar cell 101 outputs the uniform power generation energy during all period in the activating preparation state ST1, the activating state ST2, and the normal state ST3.

As illustrated in FIG. 2B, all the energy (charge) stored in the capacitor 121 is accumulated in the capacitor 121 during the period from the time T10 to the time T11 (ST1) without being consumed, and thus the energy is gradually increased.

Then, in the time T11, the energy reaches a predetermined energy for activating a load, that is, when an input voltage (a voltage applied to the load 3) Vin illustrated in FIG. 1 is equal to or higher than a predetermined voltage (threshold voltage), the load 103 starts to be activated.

Here, when the load 103 starts to be activated, the energy stored in the capacitor 121 is consumed by the activation of the load 103 during the period from the time T11 to the time T12 (ST2), and thus the energy is gradually decreased.

In addition, the energy consumed by the load 103 in the normal state is assumed to be P12'. In time T12, when the energy (P11') stored in the capacitor 121 is greater than the P12', the load 103 transitions to the normal state.

As illustrated in FIG. 2C, the load 103 consumes the energy (for example, several millijoule (mJ)) during the period in the activating state ST2 greatly larger than that in the normal state. In addition, during the period in the normal state ST3, the load 103, for example, transmits and receives signals to and from a base station, and thus a predetermined power (for example, several tens µW (J/s)).

However, in a case where the load (a wireless sensor node) 103 is driven by the solar cell 101, for example, the wireless sensor node 103 intermittently transmits information such as temperature and humidity to the base station by radio.

That is, since the wireless sensor node 103 reduces the consumption energy, the wireless sensor node performs an intermittent operation by being in an operation state (an ON state) only when transmitting and receiving signals to and from a base station, but otherwise is in a low power consumption state (an OFF state).

However, an output power from the solar cell 101 is very small, and it is not easy to obtain a stable power. Further, in order to activate the load 103, for example, the capacitance of the capacitor 121 is set to be large, and thus a space utilized by the circuit is increased, and it is not easy to realize miniaturization and thickness reduction.

Figure 3:
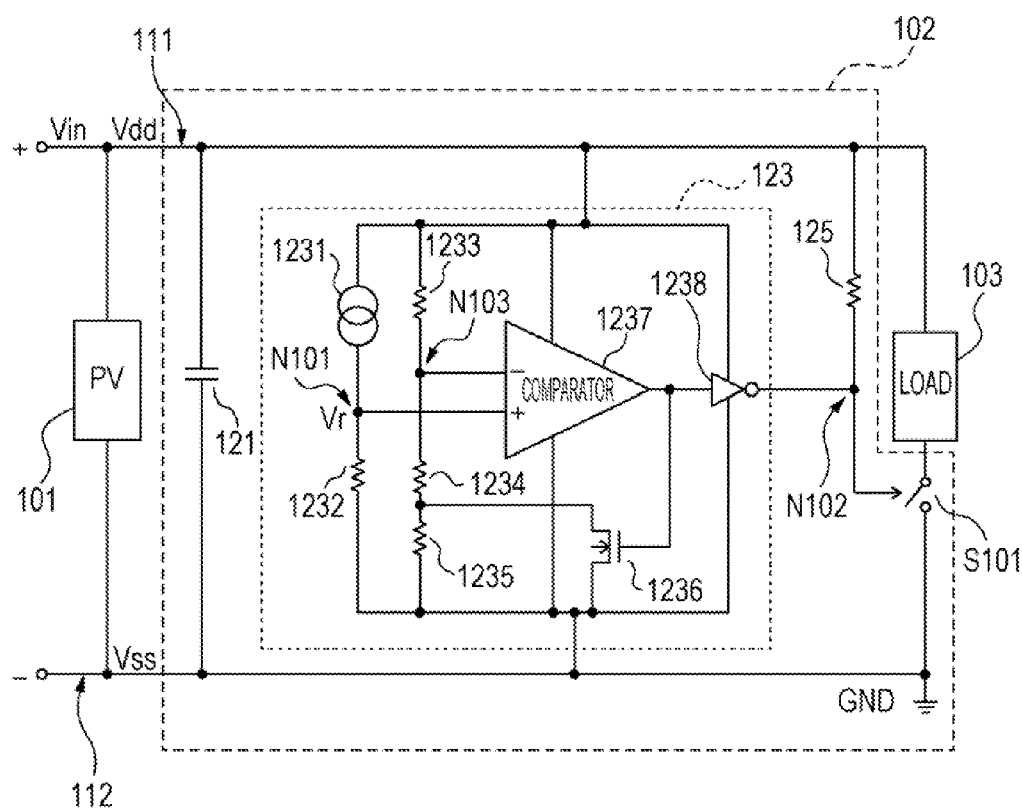
FIG. 3 is a circuit diagram illustrating a first example of the environmental power generation device.
Figure 4:
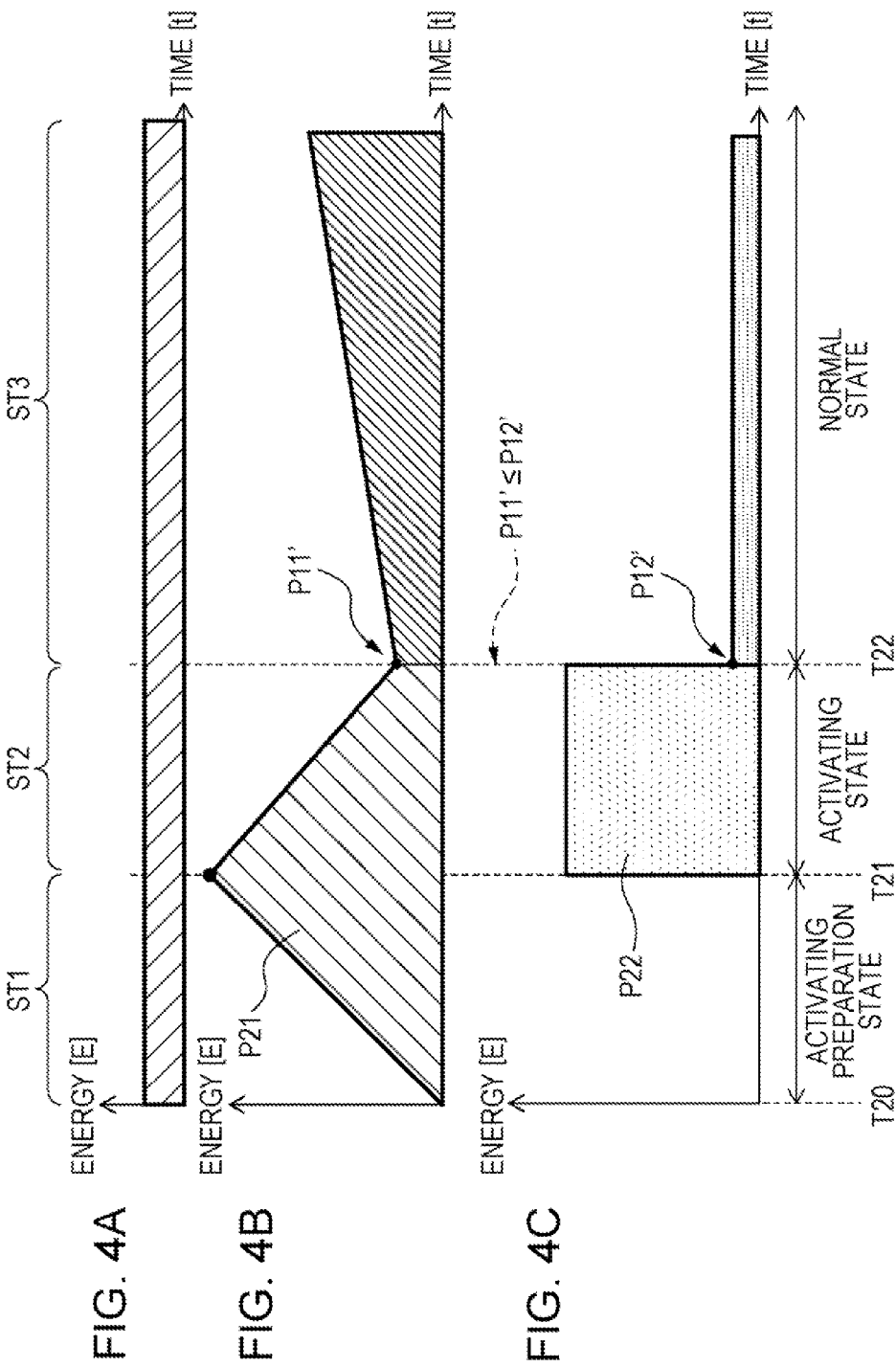
FIG. 4A to FIG. 4C are diagrams illustrating an operation of a power control circuit in the environmental power generation device illustrated in FIG. 3

FIG. 3 is a circuit diagram illustrating of first example of the environmental power generation device. As apparent from the comparison of FIG. 3 and FIG. 1 described above, a first example of the environmental power generation device includes the solar cell 101, and the power control circuit 102 including the capacitor 121, and supplies power to the load 103.

Here, a switching element S101 and the load 103 which are connected in series are provided between the high potential side power source line 111 (Vdd) to which a power source voltage of high potential side Vdd (Vin) of the solar cell 101 is applied and the low potential side power source line 112 to which a power source voltage of low potential side Vss (GND) is applied.

As illustrated in FIG. 3, the power control circuit 102 includes the capacitor 121, a hysteresis comparator 123, and the switching element S101. The power source line 111 is connected to one end of the capacitor 121, one end of the hysteresis comparator 123, and one end of and the resistor 125, and the power source line (a grounding line) 112 is connected to the other end of the capacitor 121 and the other end of the hysteresis comparator 123.

Further, the hysteresis comparator 123 includes, for example, a current source 1231, resistors 1232 to 1235, a comparator 1237, a transistor 1236, and an inverter 1238. In addition, the hysteresis comparator 123 can be realized by various configurations and is not limited to the configuration illustrated in FIG. 3.

The power source line 112 is connected to one end of the switching element S101 of which the other end is connected to the load 103, a reference voltage Vr is extracted from the connection node N101 between one end of the resistor 1232 and the other end of current source 1231. That is, the reference voltage Vr can be set to be a predetermined value by the resistor value of the resistor 1232.

The power source line 111 is connected to one end of the resistor 1233, a voltage n*Vin in proportion to the power source voltage (Vdd, Vin) is extracted from the connection node N103 between the other end of the resistor 1233 and one end of the resistor 1234. That is, it is possible to set a value of n (n<1) to be a predetermined value from the resistor values of the resistor 1232, the resistor 1234, and the resistor 1235.

The hysteresis comparator 123 is driven by the power stored in the capacitor 121 via the power source lines 111 and 112, compares the voltage (n*Vin) which is obtained by voltage-dividing the power source voltage (Vdd, Vin) of the power source line 111 by the resistor 1233, and the resistors 1234 and 1235 with the reference voltage W, and controls the switching element S101 to be turned on and off through the signal of the output node N102 of the hysteresis comparator 123. Meanwhile, an output node N102 of the hysteresis comparator 123 is connected to one end of a pull-up resistor (a pull-up element) 125 of which the other end of is connected to the power source line 111.

That is, when the voltage n*Vin in proportion to the input voltage Vin(=power source voltage Vdd) is equal to or higher than the reference voltage Vr, the switching element S101 is switched from OFF to ON (switched from the off state to the on state) by the hysteresis comparator 123, and the load 103 is activated by being connected to the power source line 112.

In other words, the input voltage Vin is equal to or higher than a threshold voltage Vref(=Vr/n), the switching element S101 is switched from OFF to ON (switched from the off state to the on state) by the hysteresis comparator 123, and the load 103 is activated by being connected to the power source line 112.

Here, the threshold voltage Vref (=Vr/n, Vr represents the reference voltage of the comparator) is set to be higher than a lower limit voltage which enables the load 103 to be operated. With this, the threshold voltage (Vref=Vr/n) in the activating state (ST2) is set to be high and in the activating preparation state (ST1), sufficient energy (charge) can be accumulated in the capacitor 121.

FIG. 4A to FIG. 4C are diagrams illustrating an operation of the power control circuit in the environmental power generation device illustrated in FIG. 3. Here, FIG. 4A to FIG. 4C correspond to FIG. 2A to FIG. 2C described above, and a time T20 to a time T22 correspond to the time T10 to the time T12 described above.

As illustrated in FIG. 4A, similar to FIG. 2A described above, the solar cell 101 outputs the uniform power generation energy (for example, several hundred μJ) regardless of the time course during all period in the activating preparation state ST1, the activating state ST2, and the normal state ST3.

As apparent from the comparison of FIG. 4B and FIG. 2B described above, the power control circuit 102 in the environmental power generation device of the first example, and the threshold voltage is set to be high such that the load 103 is in the activating state ST2 from the activating start time T11 by setting the hysteresis comparator 123, the switching element S101, and the like.

Here, energy P21 of the capacitor 121 during the period from the time T20 to the time T22 (ST1 and ST2) in FIG. 4B corresponds to the energy P11 of the capacitor 121 during the period from the time T10 to the time T12 in FIG. 2B (areas are equal one another).

That is, according to first example, when the threshold voltage in the activating start time T21 in FIG. 4B is set to be higher than the threshold voltage in FIG. 2B, even when using the capacitor 121 having small capacitance, it is possible to supply energy sufficient for activating the load 103 to be in the normal state. In addition, FIG. 4C is similar to FIG. 2C described above, and thus the energy P22 in FIG. 4C when the load 103 is activated corresponds to the energy P12 in FIG. 2C.

Figure 5:
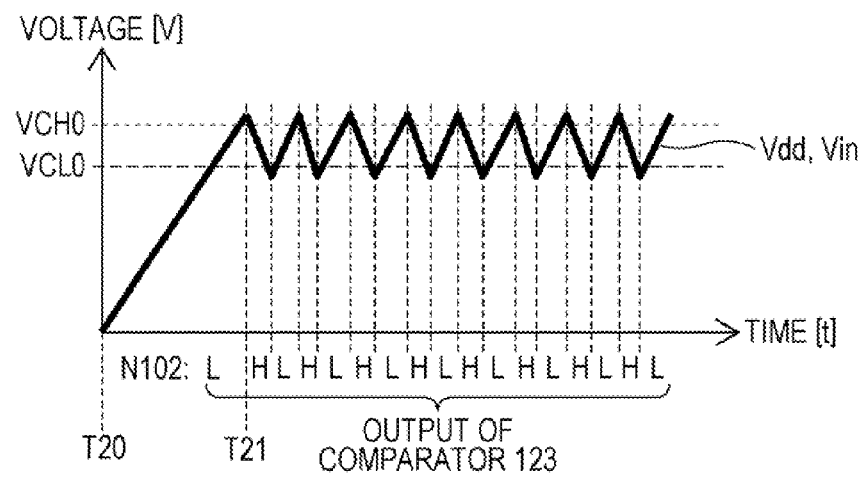
FIG. 5 is a diagram illustrating a problem of the power control circuit in the environmental power generation device illustrated in FIG. 3.

FIG. 5 is a diagram schematically illustrating a problem of the power control circuit in the environmental power generation device illustrated in FIG. 3, and illustrates a state of an output change of the hysteresis comparator 123 and the change of the power source voltage Vdd over times. In FIG. 5, a reference sign VCH0 represents a voltage with which the hysteresis comparator 123 outputs a high level "H", and VCL0 represents a voltage with which the hysteresis comparator 123 outputs a low level "L".

As illustrated in FIG. 5, in an initial state (T20), the output of the hysteresis comparator 123 is the level "L" and the switching element S101 is turned off. As time passes, the power generation energy from the solar cell 101 is accumulated in the capacitor 121, and the power source voltage Vdd (Vin) is gradually increased to become higher than the voltage VCH0 (threshold voltage output at the high level "H").

When the power source voltage Vdd is higher than VCH0 (T21), the output (node N102) of the hysteresis comparator 123 is changed from the level "L" to the level "H", and the switching element S101 is switched from OFF to OK When the switching element S101 is turned on, the power source line 112 is connected to the other end of the load 103, and the power source voltage (Vdd) is applied to the load 103.

Here, it is difficult to enable the capacitor 121 to have a large margin in the capacitance due to the restriction of the space utilized by the circuit or the like, thereby resulting in a decrease in power source voltage Vdd by the connotation of the load 103.

In addition, when the power source voltage Vdd is lower than the voltage VCL0, the output of the hysteresis comparator 123 is changed from the level "H" to the level "L", and the switching element S101 is switched from ON to OFF, thereby disconnecting (open loop) the load 103 to the power source line 112.

As a result, the power generation energy from the solar cell 101 is accumulated in the capacitor 121 again, the power source voltage Vdd is gradually increased so as to be higher than the voltage VCH0, and the same process is repeatedly performed. That is, since the output of the hysteresis comparator 123 is changed such as level "L"→level "H"→level "L"→level "H"→ . . . , a phenomenon of chattering that the state of the switching element S101 is repeatedly changed such as OFF→ON→OFF→ON→ . . . , may appear, and the load 103 remains in the activating state ST2 and thus is not possible to enter the normal state ST3.

Figure 6:
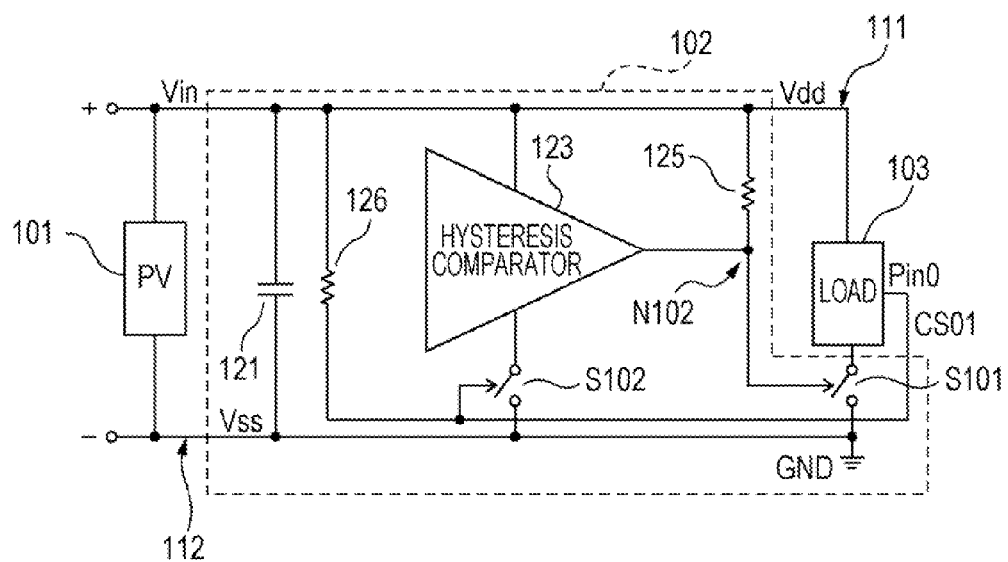
FIG. 6 is a circuit diagram illustrating a second example of the environmental power generation device.
Figure 8:
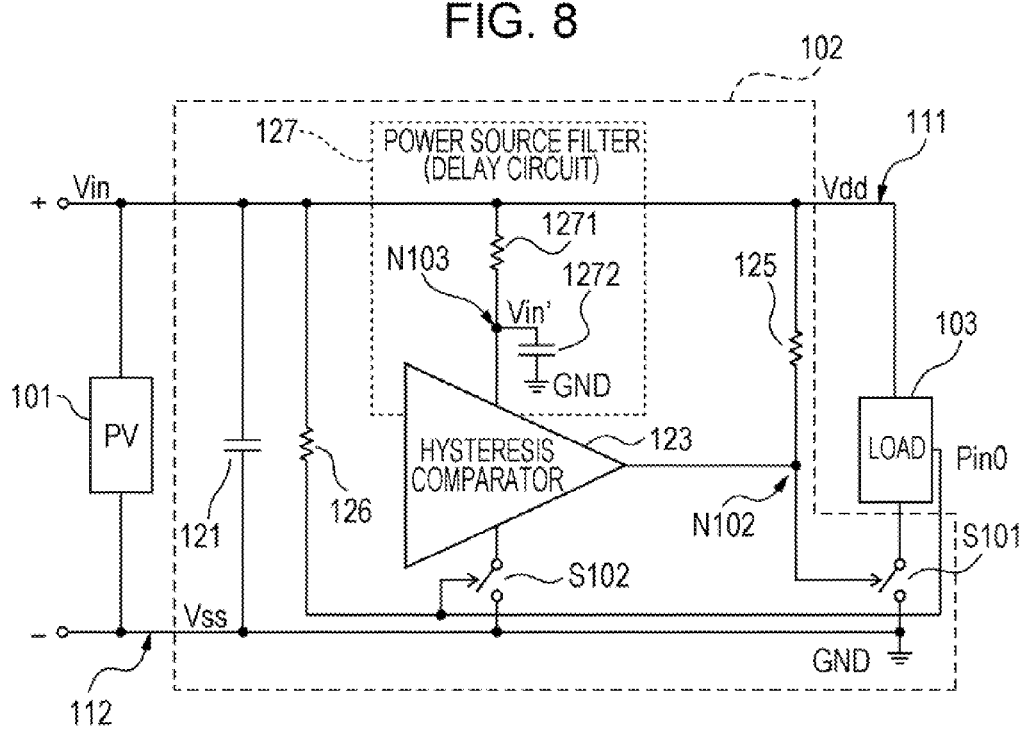
FIG. 8 is a circuit diagram illustrating a third example of the environmental power generation device.

FIG. 6 is a circuit diagram illustrating a second example of the environmental power generation device which suppresses the occurrence of the chattering in the first example described with reference to FIG. 5. As apparent from the comparison of FIG. 6 and FIG. 3 described above, in the environmental power generation device of the second example, the switching element S102 is inserted between the hysteresis comparator 123 and the low potential side power source line 112, and the switching element S102 is controlled by, for example, an output of a predetermined pin Pin0 which is provided in the load 103. Note that, since the configuration of the hysteresis comparator 123 in FIG. 6 and FIG. 8 is the same as the configuration of the hysteresis comparator 123 in FIG. 3.

That is, as illustrated in FIG. 6, the power control circuit 102 in the environmental power generation device of the second example is provided with the switching element S102 for controlling an operation of the hysteresis comparator 123, and when the load 103 is operated, the switching element S102 is controlled to be turned on and off through a signal CS01 which is changed from the level "H" to the level "L". Meanwhile, a pull-up resistor 126 of which one end of is connected to the power source line 111 (Vdd) is to allow the switching element S102 to be turned on when the signal CS01 is not the level "L".

According to second example in FIG. 6, for example, when the load 103 is operated through the signal CS01 which is output from the pin Pin0 of the load 103, the switching element S102 is turned off so as to stop the operation of the hysteresis comparator 123, and the output node of the hysteresis comparator 123 is maintained to be the level "H" via a pull-up resistor 125. With this, it is possible to suppress the occurrence of chattering in the first example described with reference to FIG. 5.

Figure 7:
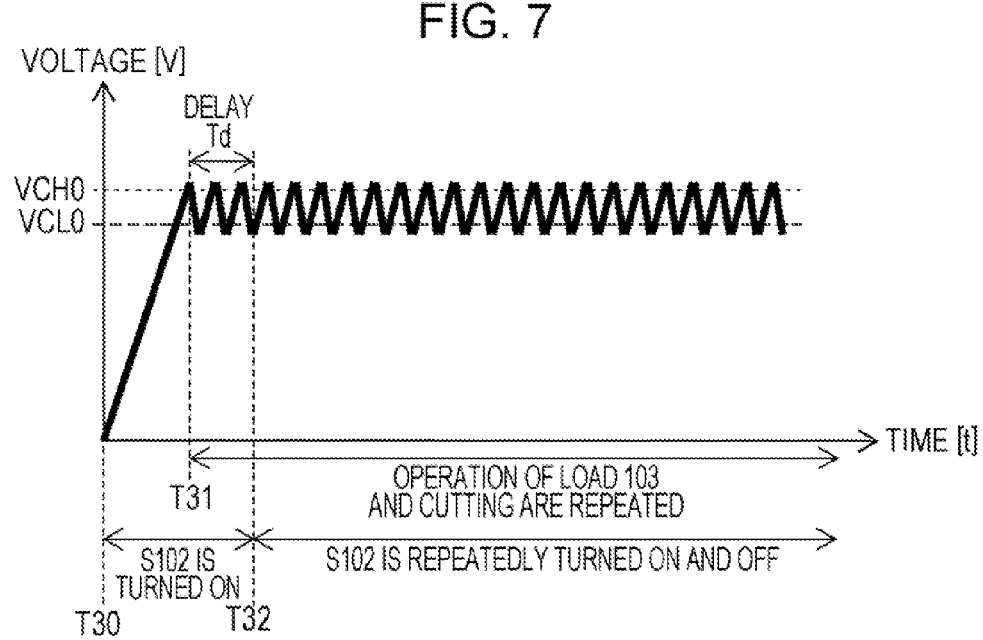
FIG. 7 is a diagram illustrating a problem of the power control circuit in the environmental power generation device illustrated in FIG. 6.

FIG. 7 is a diagram schematically illustrating a problem of the power control circuit in the environmental power generation device illustrated in FIG. 6. As illustrated in FIG. 7, in the second example, during a delay Td from a time T31 which the load 103 starts to be operated to a time T32 which the switching element S102 is turned off through the signal CS01, there is a concern in that the power source voltage Vdd becomes lower than the voltage VCL0 with which the hysteresis comparator 123 outputs the level "L".

In this way, if the power source voltage Vdd is lower than the VCL0 in the period of the time T30 to the time T32 during which the switching element S102 is turned on, that is, before stopping the operation of the hysteresis comparator 123 by provided the switching element S102, it is not easy to suppress the occurrence of the chattering.

FIG. 8 is a circuit diagram illustrating a third example of the environmental power generation device which suppresses the occurrence of the chattering in the second example described with reference to FIG. 6. That is, in the third example illustrated in FIG. 8, a power source filter (delay circuit) 127 is inserted between the hysteresis comparator 123 and the high potential side power source line 111 so as to control the power source voltage Vdd not to be lower than the voltage VCL0 in a period from the time the operation of the load 103 is started to the time the switching element S102 is turned off.

As illustrated in FIG. 8, the delay circuit 127 includes a resistor 1271 which is inserted between the high potential side power source line (Vdd, Vin) 111 and the hysteresis comparator 123, and a capacitor 1272 which is provided between the connection node N103 between the hysteresis comparator 123 and the resistor 1271, and the low potential side power source line (Vss, GND) 112.

Figure 9:
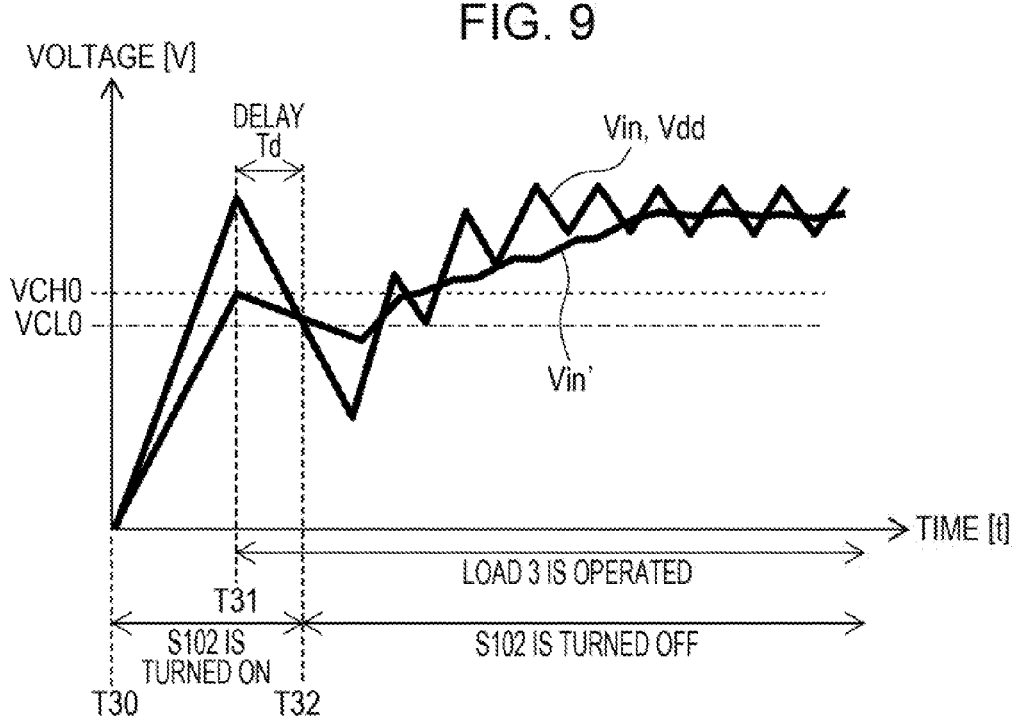
FIG. 9 is a diagram illustrating an operation of the power control circuit in the environmental power generation device illustrated in FIG. 8.

FIG. 9 is a diagram illustrating an operation of the power control circuit in the environmental power generation device illustrated in FIG. 8. As illustrated in FIG. 9, a power source voltage (a voltage of the node N103) Vin' which is applied to the hysteresis comparator 123 is slowly changed compared with the voltage yin (Vdd) of the high potential side power source line 111, and the power source voltage Vin' is set not to be lower than the voltage VCL0 during the delay Td.

For this reason, regardless of the delay Td, it is possible to suppress the occurrence of the chattering. However, since the delay circuit 127 includes, for example, the capacitor 1272, the space utilized by the power control circuit 102 is increased.

In addition, in the second example and third example described above, when the load 103 is operated, the signal CS01 which is changed from the level "H" to level "L" is used, and thus in a case where the load 103 is not provided with the pin Pin0 for outputting such a signal CS01, a circuit for outputting the signal CS01 has to be provided. That is, the load to which the environmental power generation device (the power control circuit) is applicable is limited. In addition, since signal inversion of the signal CS01 is slower than signal inversion of the node N102, the chattering is likely to occur. For this reason, the comparator 123 is limited to a hysteresis-type comparator.

Hereinafter, embodiments of the power control circuit for supplying stable power to various types of loads while increasing the space utilized by the circuit, the environmental power generation device, and a control method of the environmental power generation device will specifically described with reference to the drawings.

First Embodiment

Figure 10:
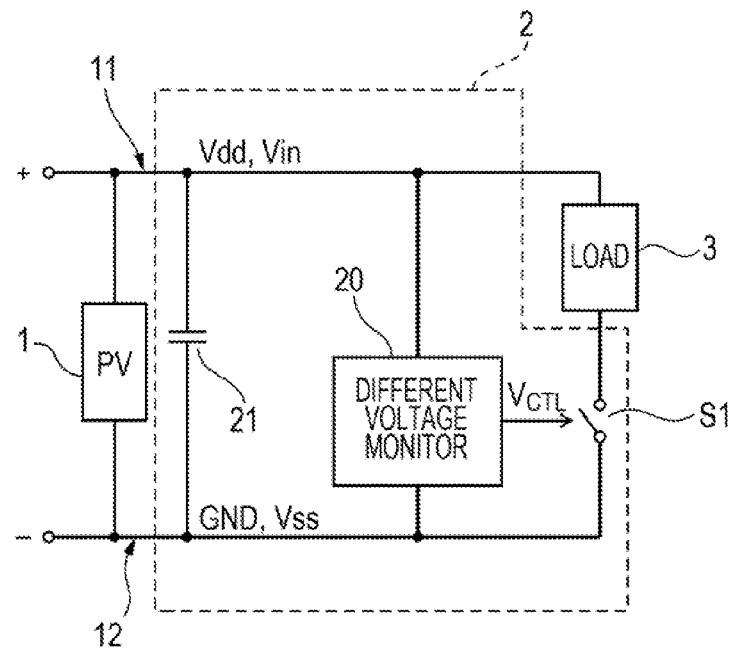
FIG. 10 is a circuit diagram illustrating the environmental power generation device in a first embodiment.

FIG. 10 is a circuit diagram illustrating the environmental power generation device in a first embodiment. As illustrated in FIG. 10, the environmental power generation device in the first embodiment includes a solar cell (PV) 1 and a power control circuit 2, and supplies the power to a load 3 so as to drive the load 3.

Note that, as described above, in addition to the photovoltaic generator (the solar cell 1) using light energy, for example, a vibration power generator or a heat generator which use vibration and heat, or an electromagnetic wave generator using electromagnetic wave energy can be applied to as the energy harvester, In addition, needless to say, a micro-voltage obtained by the solar cell 1 is boosted by, for example, the DC-DC converter (not illustrated), and the boosted voltage can be applied to the load 3.

The power source voltage of high potential side (a first voltage) Vdd (Vin) of the solar cell 1 is applied to the high potential side power source line (a first power source line or a first electrode) 11, and the power source voltage of low potential side (a second voltage) Vss (GND) is applied to the low potential side power source line (a second power source line or a second electrode) 12.

The power control circuit 2 includes a differential voltage monitor 20, a capacitor 21, and a switching element (the first switching element) S1. The differential voltage monitor 20 is provided between the high potential side power source line 11 and the low potential side power source line 12, and monitors a differential voltage Vd (=Vdd−Vss) between the power source voltage of high potential side Vdd and the power source voltage of low potential side Vss so as to control the switching element S1 to be turned on and off.

Here, the capacitor 21 which accumulates the power from the solar cell 1 is provided between the power source lines 11 and 12. In addition, the differential voltage Vd satisfies, for example, Vd=Vdd in a case where the power source voltage of low potential side Vss (GND) is fixed to be 0 V.

Figure 11:
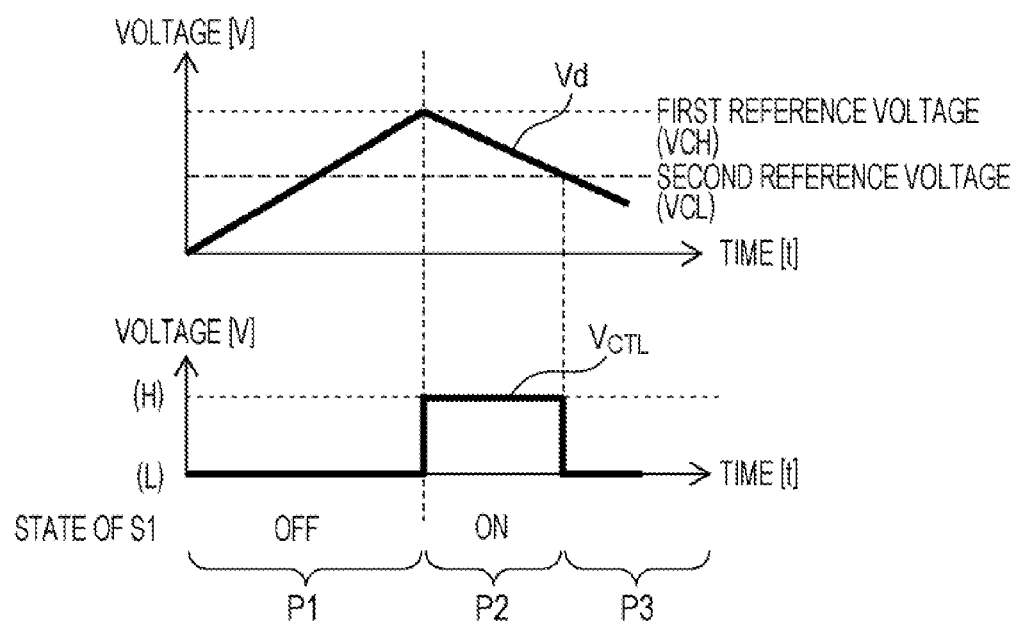
FIG. 11 is a diagram illustrating an operation of the environmental power generation device illustrated in FIG. 10.

FIG. 11 is a diagram illustrating an operation of the environmental power generation device illustrated in FIG. 10. The differential voltage monitor 20 monitors the differential voltage Vd, when the differential voltage Vd is increased (the potential difference between Vdd and Vss is increased), the switching element S1 is controlled to be turned off state when the differential voltage Vd is lower than the first reference voltage VCH.

That is, the differential voltage monitor 20 controls a control voltage $V_{CTL}$ to be, for example, the low level "L" such that the switching element S1 is maintained in the off state, and accumulates the power from the solar cell 1 in the capacitor 21 in a period P1.

In addition, in a case where the differential voltage Vd is increased, when the differential voltage Vd equal to or higher than the first reference voltage VCH, the differential voltage monitor 20 controls the switching element S1 to be turned on state. Further, in a case where the differential voltage Vd is decreased (the potential difference between Vdd and Vss is decreased), when the differential voltage Vd is equal to or lower than a second reference voltage VCL, the differential voltage monitor 20 controls the switching element S1 to be turned off state.

That is, the differential voltage monitor 20 sets the control voltage $V_{CTL}$, for example, to be the high level "H" in a period P2 during from the time the differential voltage Vd is increased and is equal to or higher than the first reference voltage VCH to the time the differential voltage Vd is decreased and is equal to or lower than the second reference voltage VCL. With this, the switching element S1 is turned to be on state in the period P2 and the load 3 is driven by the power accumulated d in the capacitor 21.

Meanwhile, in a case where the differential voltage Vd is decreased and is equal to or lower than the second reference voltage VCL, the differential voltage monitor 20 controls the switching element S1 to be turned on the off state by setting the control voltage $V_{CTL}$, for example, to be the level "L".

Here, the first reference voltage VCH is set to be a voltage higher than the second reference voltage VCL, the first reference voltage VCH is set to be voltage equal to or lower than the upper limit voltage, which enables the operation of the load 3, and the second reference voltage VCL is set to be a voltage which is equal to or higher than the lower limit voltage, which enables the operation of the load 3.

In addition, when the first reference voltage VCH is set to be the upper limit voltage, which enables the operation of the load 3, and the second reference voltage VCL is set to be the lower limit voltage, which enables the operation of the load 3, for example, the capacitance of the capacitor 21 can be minimum, and thus such a configuration is preferable.

Second Embodiment

Figure 12A:
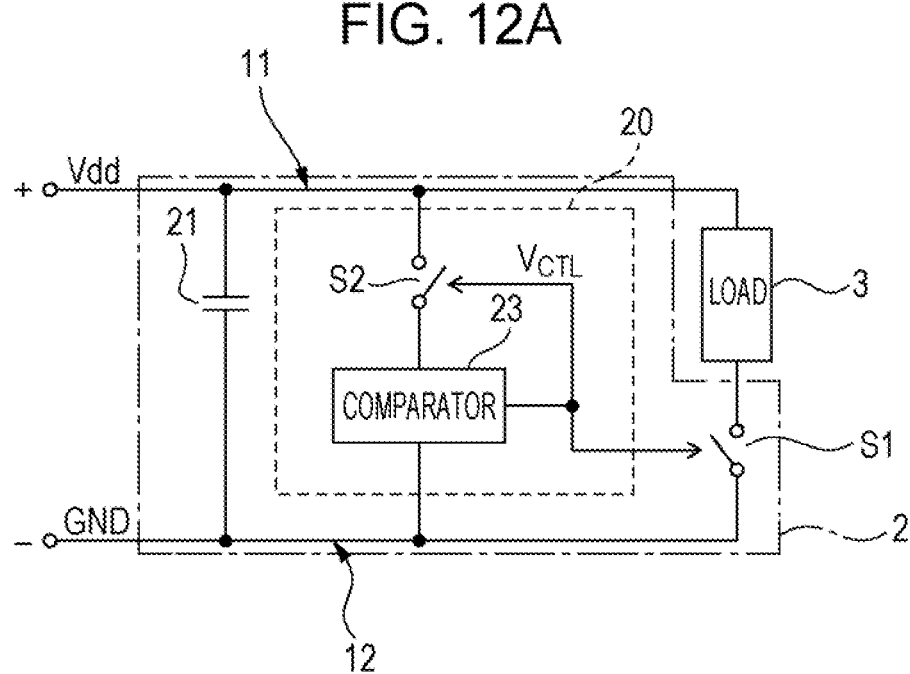
FIG. 12A and FIG. 12B are circuit diagrams illustrating an environmental power generation device in a second embodiment.
Figure 12B:
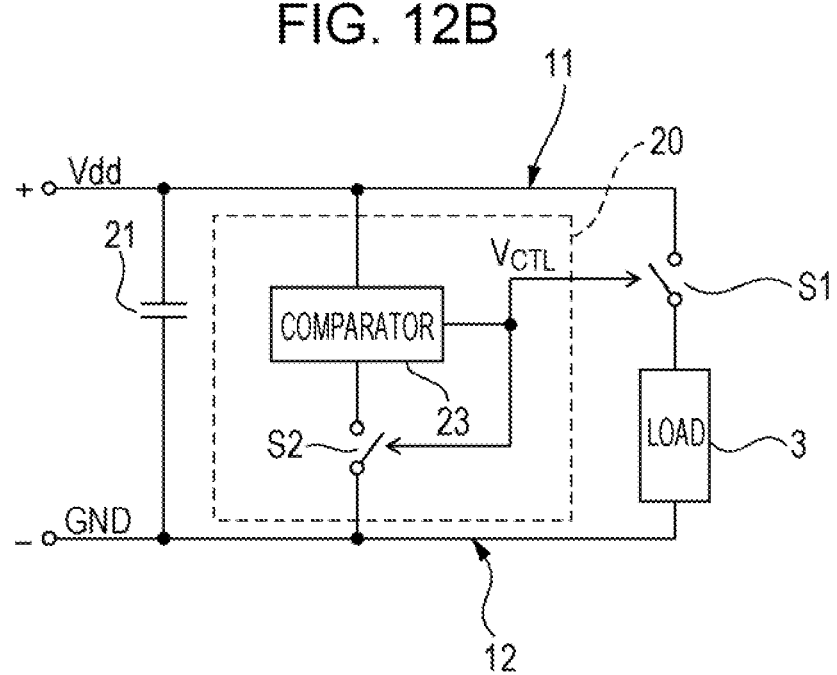

FIG. 12A and FIG. 12B are circuit diagrams illustrating the second embodiment of the environmental power generation device, and the described differential voltage monitor 20 is provided between the power source lines 11 and 12, and is formed of a comparator (the first comparator) 23 and a switching element (the second switching element) S2 which are connected in series.

Here, FIG. 12A illustrates an example in which the switching element S2 is connected to the high potential side power source line 11 (Vdd), and FIG. 12B illustrates an example in which the switching element S2 is connected to the low potential side power source line 12 (Vss). Note that, for the sake of simplicity, the solar cell (PV) 1 is not illustrated.

That is, in the environmental power generation device of the second embodiment illustrated in FIG. 12A and FIG. 12B, the differential voltage monitor 20 is provided between the power source lines 11 and 12, and includes the comparator 23 and the switching element S2 which are connected in series. Here, the switching elements S1 and S2 are controlled to be turned on and off by an output voltage (the control voltage $V_{CTL}$) of the comparator 23.

Figure 13A:
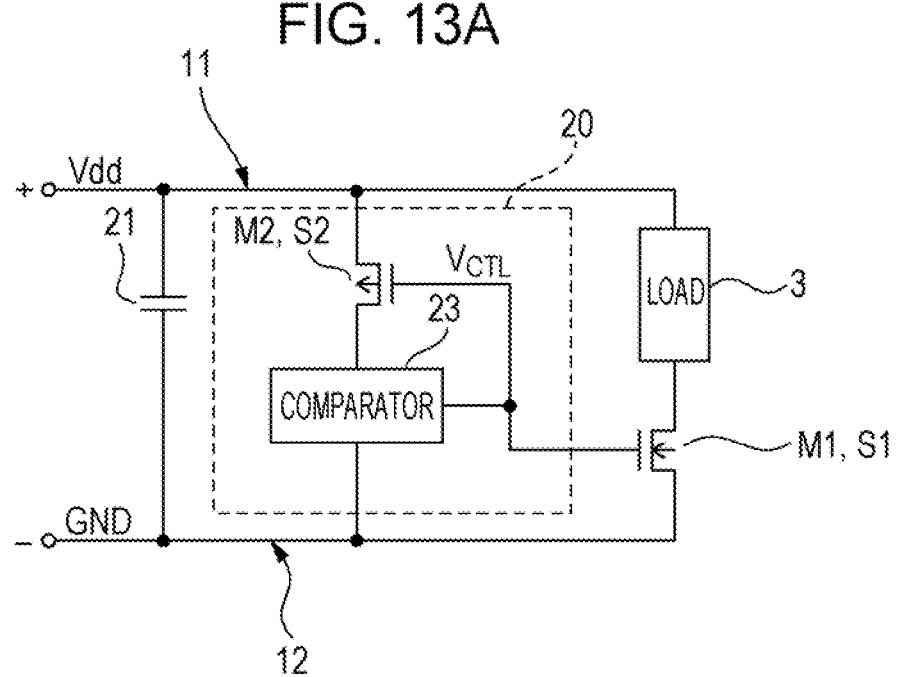
FIG. 13A and FIG. 13B are circuit diagrams illustrating a configuration example of the environmental power generation device illustrated in FIG. 12A and FIG. 12B.
Figure 13B:
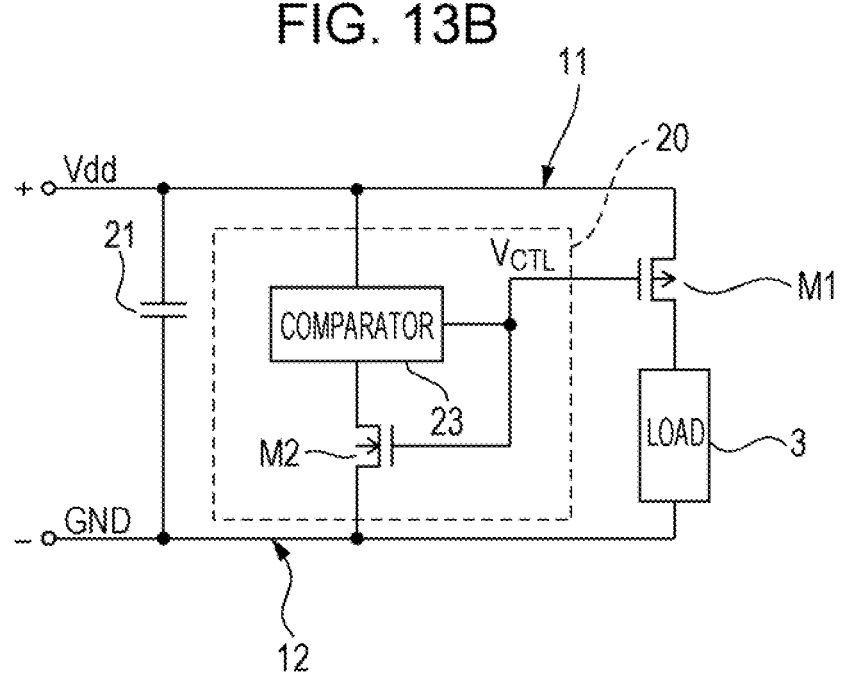

FIG. 13A and FIG. 13B are circuit diagrams illustrating a configuration example of the environmental power generation device illustrated in FIG. 12, and FIG. 13A illustrates one configuration example of the environmental power generation device illustrated in FIG. 12A, and FIG. 13B illustrates one configuration example of the environmental power generation device illustrated in FIG. 12B.

First, as illustrated in FIG. 13A, in the one configuration example of the environmental power generation device illustrated in FIG. 12A, the switching element S1 is set to be an n-channel type MOS (nMOS) transistor M1, and the switching element S2 is set to be a p-channel type MOS (pMOS) transistor M2.

In addition, as illustrated in FIG. 13B, in the one configuration example of the environmental power generation device illustrated in FIG. 12B, the switching element S1 is set to be a p-type MOS transistor M1, and the switching element S2 is set to be an n-type MOS transistor M2.

That is, the switching elements S1 and S2 are formed of different conductive transistors, and a switch on the pull-up side which is connected to the high potential side power source line 11 is set to be a p-type MOS transistor, and a switch on the pull-down side which is connected to the low potential side power source line 12 is set to be an n-type MOS transistor.

Figure 14:
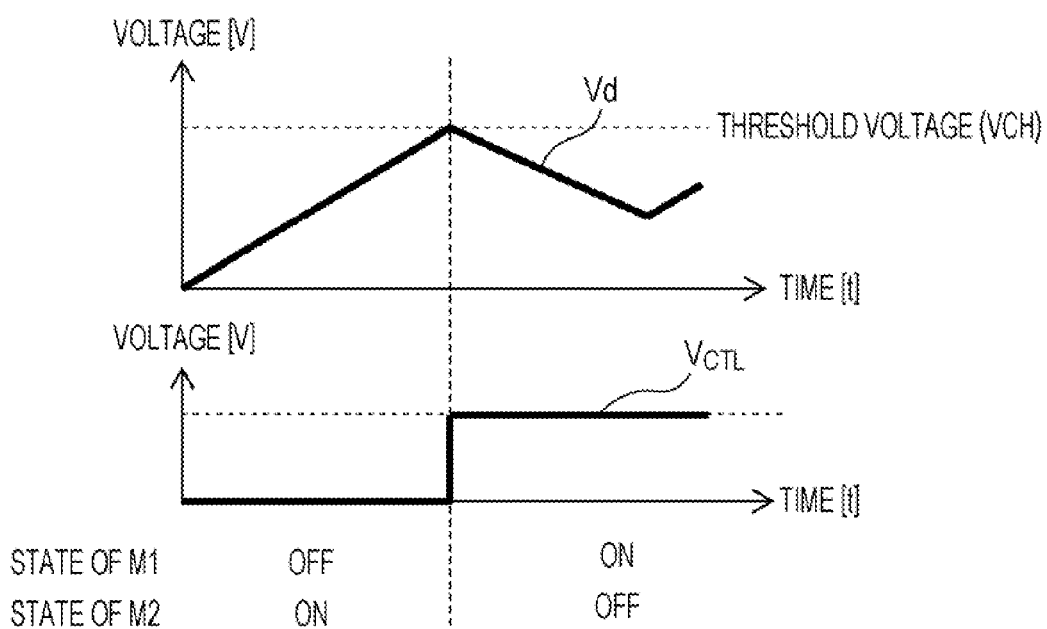
FIG. 14 is a diagram illustrating an operation of the environmental power generation device illustrated in FIG. 13A.

FIG. 14 is a diagram illustrating an operation of the environmental power generation device illustrated in FIG. 13A. As illustrated in FIG. 14, in the environmental power generation device illustrated in FIG. 13A, when the differential voltage Vd (Vdd) is increased and is equal to or higher than the threshold voltage (VCH), the output of the comparator 23 (control voltage $V_{CTL}$) is changed from the level "L" to the level "H". With this, the n-type MOS transistor M1 is switched from OFF to ON, and the p-type MOS transistor M2 is switched from ON to OFF.

Note that, in a case where the same operation is performed in the environmental power generation device illustrated in FIG. 13B, for example, the level of the control voltage $V_{CTL}$ from the comparator 23 may be inverted. In addition, such a modification will be described in detail below.

Third Embodiment

Figure 15A:
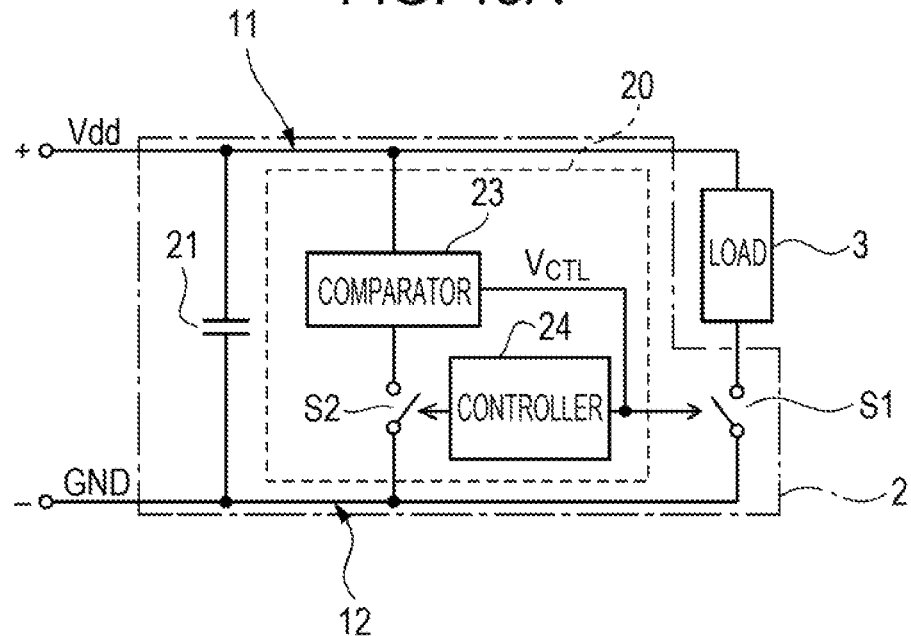
FIG. 15A and FIG. 15B are circuit diagrams illustrating an environmental power generation device in a third embodiment.
Figure 15B:
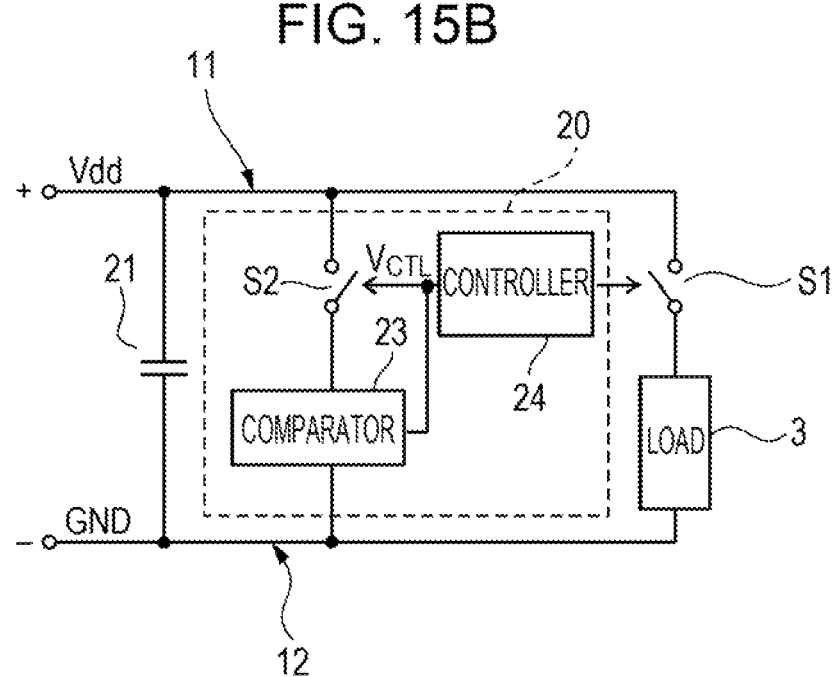

FIG. 15A and FIG. 15B are circuit diagrams illustrating the third embodiment of the environmental power generation device, and illustrate a controller 24 which is provided between the output of the comparator 23 and the switching element S1 or S2 (a control terminal) in the second embodiment described with reference to FIG. 12.

Here, FIG. 15A illustrates that the controller 24 is inserted between the output of the comparator 23 and the switching element S2 in the environmental power generation device illustrated in FIG. 12A. In addition, FIG. 15B illustrates that the controller 24 is inserted between the output of the comparator 23 and the switching element S1 in the environmental power generation device illustrated in FIG. 12B.

That is, in the environmental power generation device in the third embodiment, for example, the switching elements S1 and S2 are formed of the same conductive transistors, and the controller 24 is formed of an inverter, and it is possible to control the switching elements S1 and S2 to be turned on and off in a complementary manner.

Figure 16A:
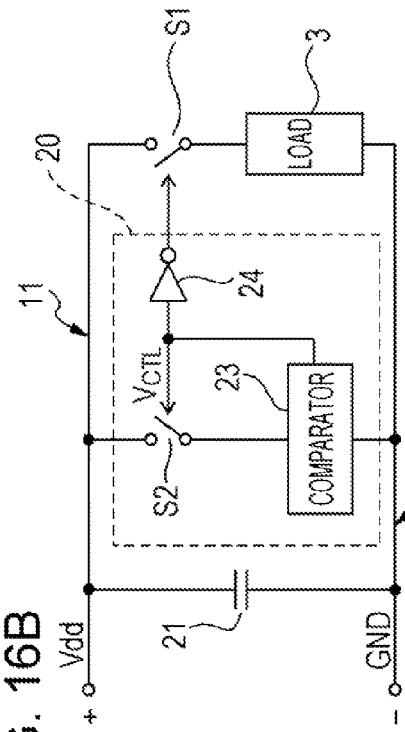
FIG. 16A to FIG. 16D are circuit diagrams (part 1) illustrating a configuration example of the environmental power generation device illustrated in FIG. 15A and FIG. 15B.
Figure 16B:
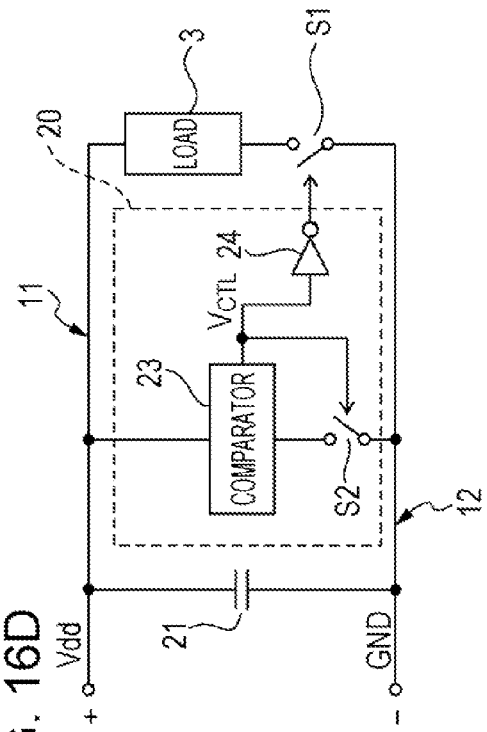
Figure 16C:
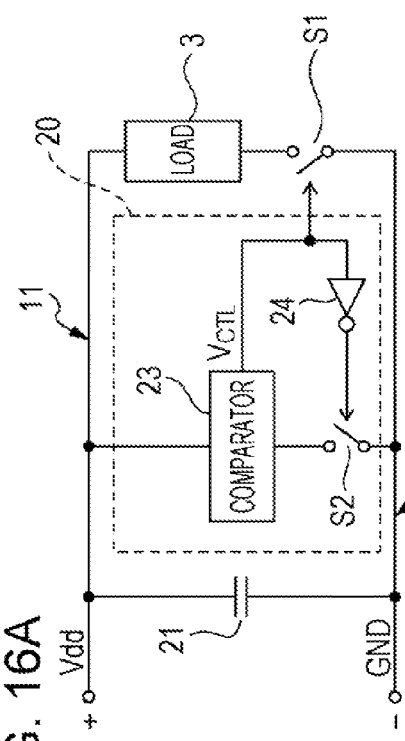

FIG. 16A to FIG. 16B are circuit diagrams (part 1) illustrating a configuration example of the environmental power generation device illustrated in FIG. 15, and illustrate the controller 24 which is formed as the inverter. Here, FIG. 16A and FIG. 16B correspond to FIG. 15A and FIG. 15B.

Figure 16D:
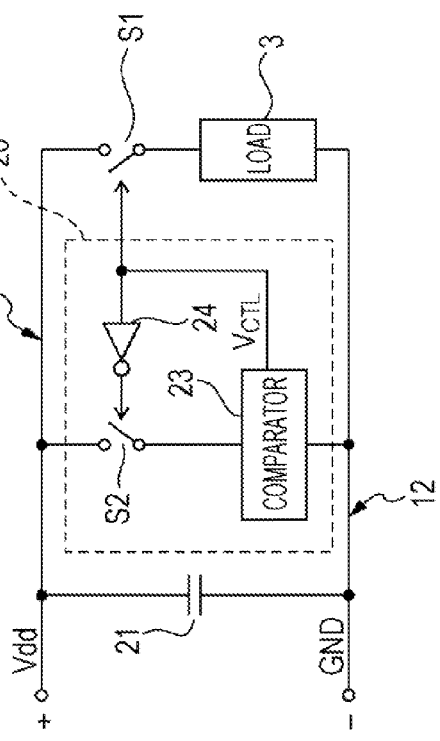

In addition, 9G. 16C illustrates that the inverter 24 is provided between the output of the comparator 23 and the switching element S1 is changed to be provided between the output of the comparator 23 and the switching element S2 in FIG. 16B. Further, FIG. 16D illustrates that the inverter 24 provided between the output of the comparator 23 and the switching element S2 is changed to be provided between the output of the comparator 23 and the switching element S1 in FIG. 16A.

As illustrated in FIG. 16A to FIG. 16D, in the environmental power generation device of the third embodiment, it is possible to variously modify, for example, the disposition of the load 3 and the switching element S1 which are provided in series between the power source lines 11 and 12, or the disposition of the comparator 23 and the switching element S2. A position in which the inverter (controller) 24 is provided can be between the output of the comparator 23 and the switching element S1 or S2.

Figure 17A:
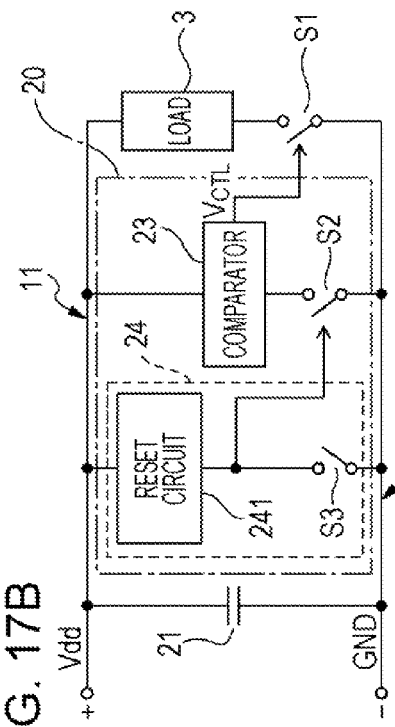
FIG. 17A to FIG. 17D are circuit diagrams (part 2) illustrating a configuration example of the environmental power generation device illustrated in FIG. 15A and FIG. 15B.
Figure 17B:
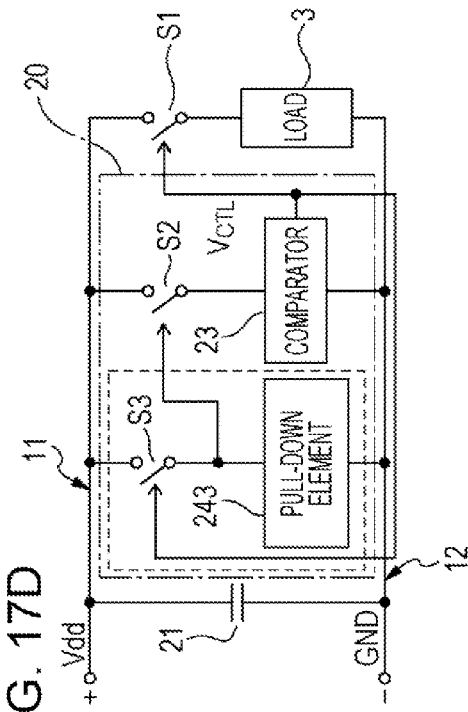

FIG. 17A to FIG. 17B are circuit diagrams (part 2) illustrating a configuration example of the environmental power generation device illustrated in FIG. 15, FIG. 17A, FIG. 17B, and FIG. 17C correspond to FIG. 15A. In addition, FIG. 17D illustrates that the switching elements S1 to S3 which are connected to the high potential side power source line 11 are connected to the low potential side power source line 12 in the environmental power generation device illustrated in FIG. 17C.

That is, FIG. 17A illustrates that the controller 24 which is provided between the output of the comparator 23 and the switching element S2 is connected to two switching elements S3 and S3' which are operated in a complementary manner in the environmental power generation device illustrated in FIG. 15A. That is, the controller (the inverter) 24 can be formed of the switching elements S3 and S3'.

In addition, FIG. 17B illustrates that the controller 24 is formed of the reset circuit 241 and the switching element (the third switching element) S3 which are provided in series between the power source lines 11 and 12 in the environmental power generation device illustrated in FIG. 15A. In addition, the reset circuit 241 can be formed of, for example, a switching element (a fourth switching element or a reset switch) S4 which can manually or automatically perform the reset operation.

Figure 17C:
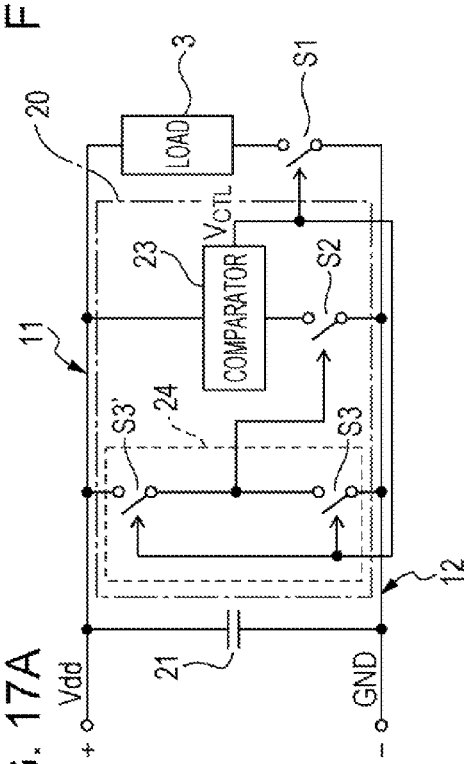
Figure 17D:
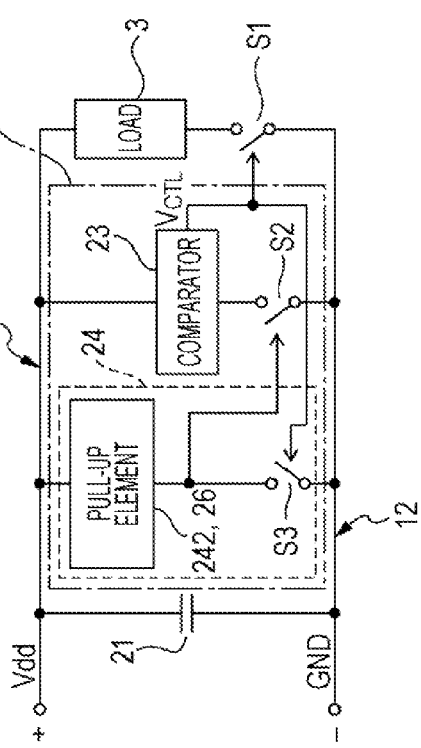

Further, FIG. 17C illustrates that the controller 24 is formed of a pull-up element 242 and the switching element S3 which are provided in series between the power source lines 11 and 12 in the environmental power generation device illustrated in FIG. 15A. Meanwhile, a pull-up element 242 (26) can be used as the reset switch, and the switching element S3 is controlled to be turned on and off by the output of the comparator 23 (the control voltage $V_{CTL}$).

In addition, FIG. 17O illustrates that the switching elements S1 and S2 which are provided on the power source line 11 side, and the controller 24 which is formed of a pull-down element 243 and the switching element S3 which are provided in series between the power source lines 11 and 12 in the environmental power generation device in illustrated FIG. 17C. In addition, the pull-down element 243 can be used as the reset switch, and the switching element S3 is controlled to be turned on and off by the output of the comparator 23. In this way, it is found that the controller 24 can be variously formed with respect to the environmental power generation device in the third embodiment.

Figure 18:
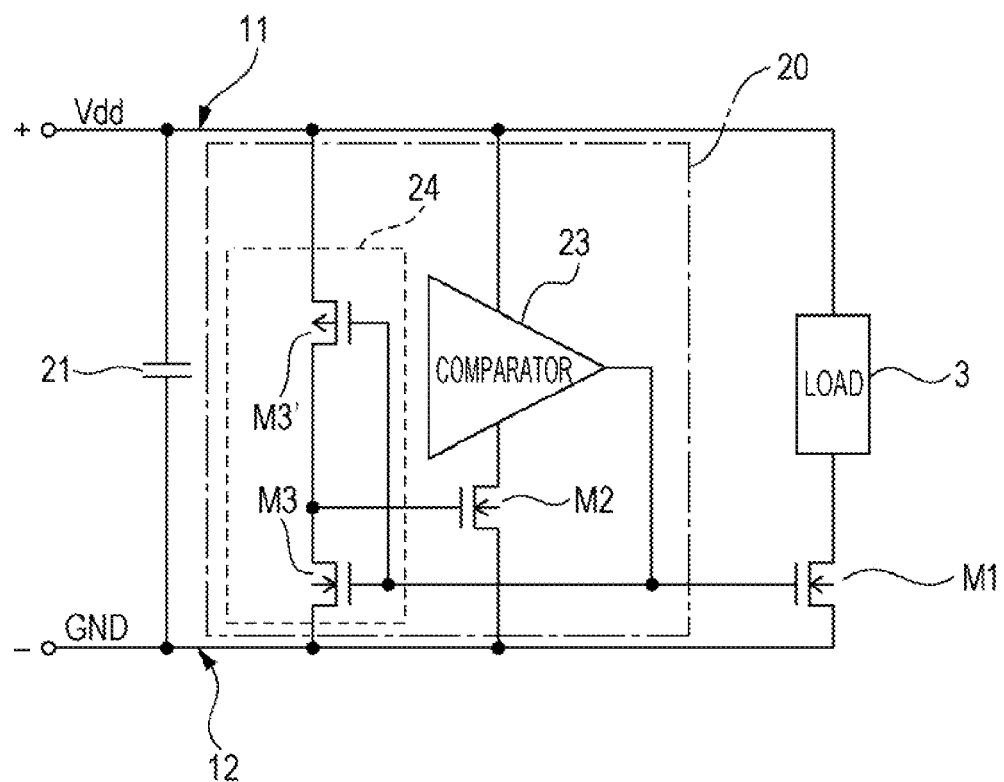
FIG. 18 is a circuit diagram illustrating an example of the environmental power generation device illustrated in FIG. 17A.

FIG. 18 is a circuit diagram illustrating an example of the environmental power generation device illustrated in FIG. 17A, and illustrates that the respective switching elements S1 to S3 in the environmental power generation device illustrated in FIG. 17A are formed of the n-type MOS transistor M1 to M3, and the switching element S3' is formed of a p-type MOS transistor M3'. Here, n-type MOS transistor M3 and p-type MOS transistor MT forms the inverter.

That is, the n-type MOS transistor M1 (the first switching element S1) is controlled through the signal ($V_{CTL}$) from the output of the comparator 23, and the n-type MOS transistor M2 (the second switching element S2) is controlled through the signal obtained by inverting the output of the comparator 23 by the inverter (M3 and M3').

Fourth Embodiment

Figure 19A:
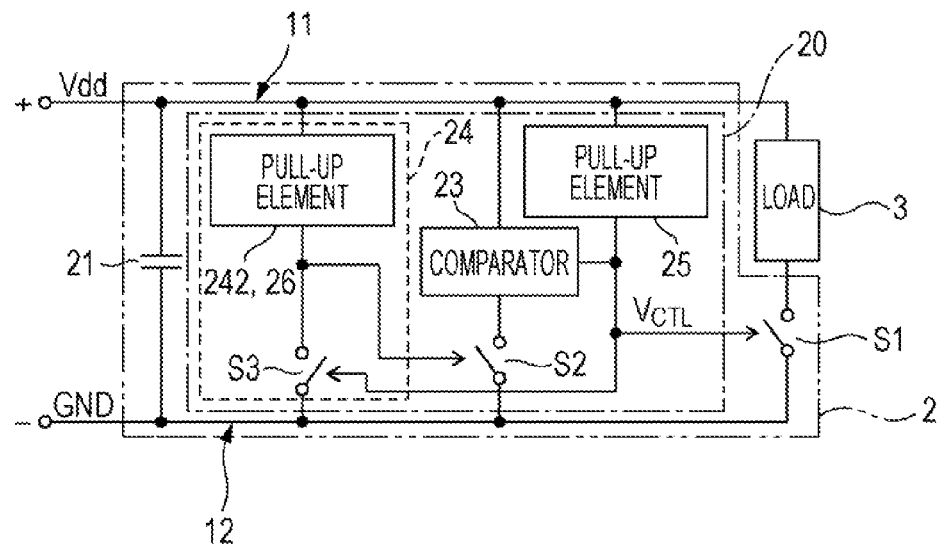
FIG. 19A and FIG. 19B are circuit diagrams illustrating an environmental power generation device in a fourth embodiment.
Figure 19B:
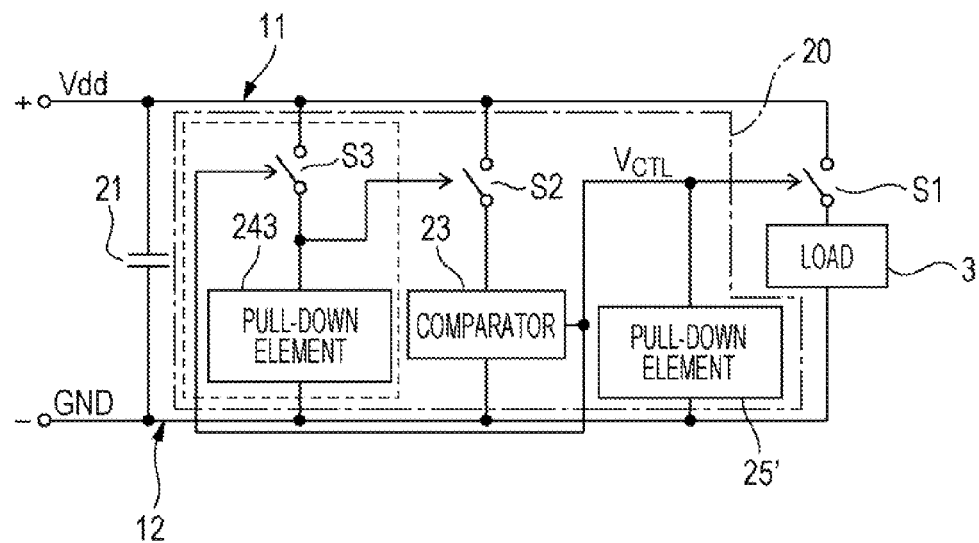

FIG. 19A and FIG. 19B are circuit diagrams illustrating fourth embodiment of the environmental power generation device. Here, FIG. 19A illustrates that a pull-up element 25 is provided between the output of the comparator 23 and the high potential side power source line 11 in the environmental power generation device illustrated in FIG. 17C.

In addition, FIG. 19b illustrates that a pull-down element (a second pull-down element 25' is provided between the output of the comparator 23 and the low potential side power source line 12 in the environmental power generation device illustrated in FIG. 17D. Here, each of the pull-up element 25 in the environmental power generation device illustrated in FIG. 19A and the pull-down element 25' in the environmental power generation device illustrated in FIG. 19B functions of improving driving performance of the output of the comparator 23.

Figure 20A:
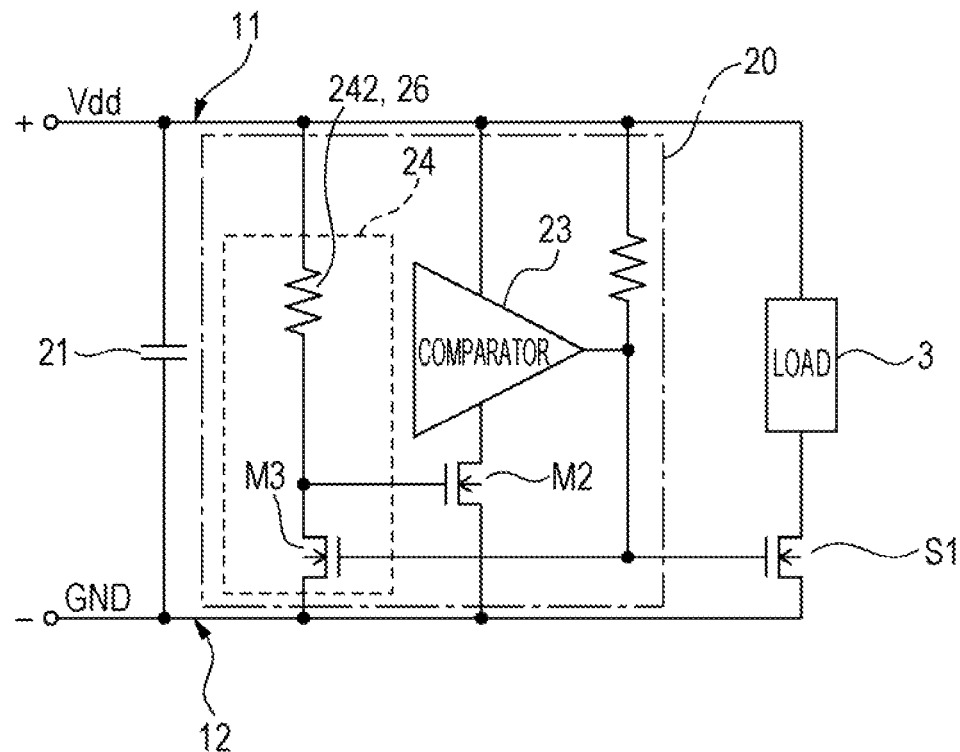
FIG. 20A and FIG. 20B are circuit diagrams illustrating a configuration example of the environmental power generation device illustrated in FIG. 19A and FIG. 19B.
Figure 20B:
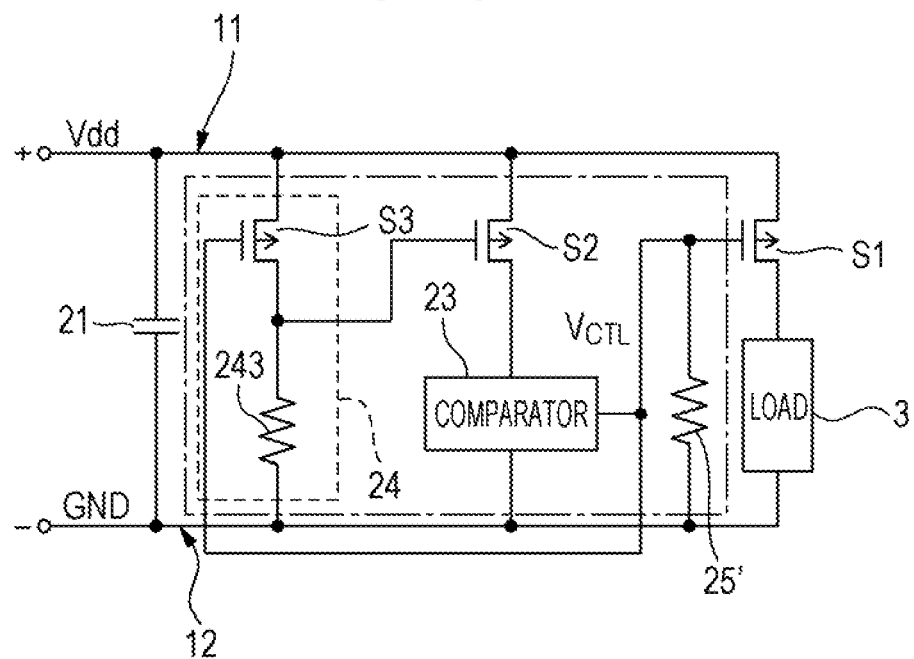

FIG. 20A and FIG. 20B are circuit diagrams illustrating a configuration example of the environmental power generation device illustrated in FIG. 19. Here, FIG. 20A illustrates that the switching elements S1 to S3 are formed of the n-type MOS transistors M1 to M3, and the pull-up elements 242 (26) and 25 are formed of the resistor in the environmental power generation device illustrated in FIG. 19A.

In addition, FIG. 20B illustrates that the switching elements S1 to S3 are formed of the p-type MOS transistors M1 to M3, and the pull-down elements 243 and 25' are formed of the resistor in the environmental power generation device illustrated in FIG. 19B.

Fifth Embodiment

Figure 21:
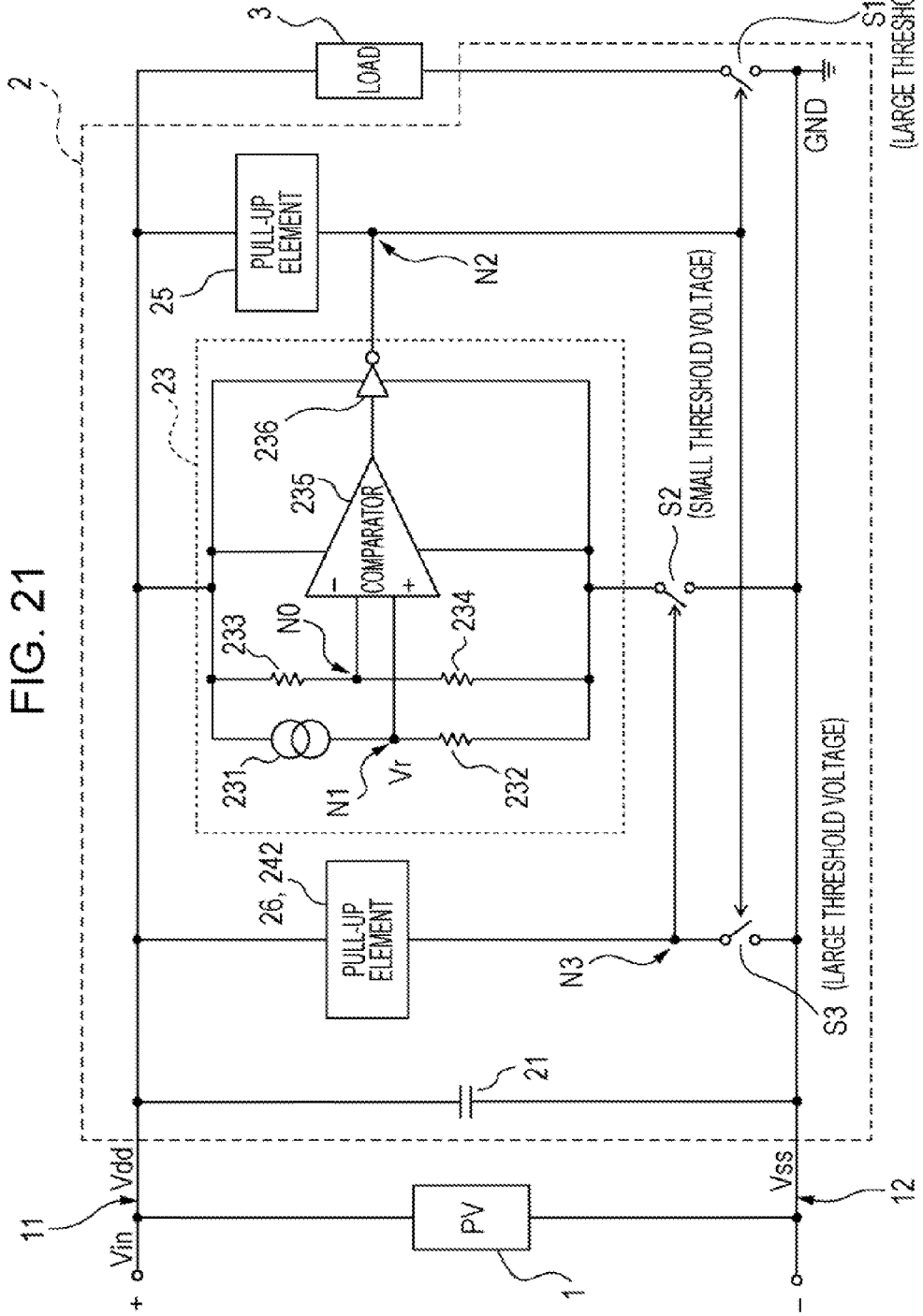
FIG. 21 is a circuit diagram illustrating the environmental power generation device in a fifth embodiment.

FIG. 21 is a circuit diagram illustrating the fifth embodiment of the environmental power generation device, and absolute values (threshold voltages of first to third transistors Q1 to Q3) of the thresholds of the switching elements S1 to S3 are set in the environmental power generation device illustrated in FIG. 19A.

Note that, in FIG. 21, the solar cell 1 is illustrated as the energy harvesting; however, the energy harvesting is not limited to the solar cell (PV), the vibration power generator, the heat generator, or the electromagnetic wave generator may be applied thereto, and may is boosted by the DC-DC converter as described above.

As illustrated in FIG. 21, the power control circuit (2) of the fifth embodiment includes the capacitor 21, the comparator 23, a first pull-up element 26 (242), a second pull-up element 25, and the first to third switching elements S1 to S3.

The comparator (the first comparator) 23 includes a current source 231, resistors 232 to 234, a comparator 235, and an inverter 236. Note that, the comparator 23 can be variously formed, and is not limited to the comparator illustrated in FIG. 21.

The first power source line 11 is connected to one end of the load 3, one end of the capacitor 21, one end of the first pull-up element 26 (242), one end of the second pull-up element 25, and one end of the first comparator 23. In addition, the other end of the load 3 is connected to one end of the switching element (the first switching element) Si, and the other end of the comparator 23 is connected to one end of the switching element (the second switching element) S2.

Further, the other end of pull-up element 26 is connected to one end of the switching element (the third switching element) S3, the second power source line 12 is connected to the other end of the capacitor 21 and the other end of the switching elements S1 to S3.

That is, the capacitor 21 is connected between the power source lines 11 and 12, and accumulates the energy (charge) from the solar cell 1. In addition, the load 3 and the switching element Si, the comparator 23 and the switching element S2, and the pull-up element 26 and the switching element S3, which are connected in series are provided between the power source lines 11 and 12.

The reference voltage Vr is extracted from the connection node N1 between the other end of the current source 231 and one end of the resistor 232. The voltage (n*Vdd=n*Vin) in proportion to the power source voltage (Vdd, Vin) is extracted from a connection node N0 between the other end of the resistor 233 and one end of the resistor 234. Here, n represents ratio of resistor values of the resistor 233 and the resistor value of the resistor 234.

The comparator 23 is driven by the power stored in the capacitor 21 by via the power source lines 11 and 12, and compares the voltage (n*Vdd=n*Vin) which is obtained by voltage-dividing the power source voltage Vdd (Vin) of the power source line 11 by the resistors 233 and 234 with the reference voltage Vr.

The output of the comparator 23 is connected to the other end of the pull-up element 25, and the switching elements S1 and S3 are controlled to be turned on and off through the signal of the output of the connection node N2 between the comparator 23 and the other end of the pull-up element 25. In addition, the switching element S2 is controlled to be turned on and off through the signal of the connection node N3 between the other end of pull-up element 26 and one end of the switching element S3.

Meanwhile, the comparator (the first comparator) 23 is not limited to the configuration illustrated in FIG. 21, but other configurations may be employed, for example, when comparing the power source voltage Vdd (Vin) and the threshold voltage Vref(=the reference voltage Vr/n) as long as the power source voltage Vdd is becomes higher than the threshold voltage Vref and thus the level "H" is output.

Here, a threshold (the absolute value of threshold) which allows the second switching element S2 to be turned on and off is set to be smaller than a threshold which allows the first switching element S1 to be turned on and off and a threshold which allows the third switching element S3 to be turned on and off. A third threshold (Vth3) may be set to be the same as the first threshold (Vth1), and also can be set to be smaller than the first threshold Vth1.

As described above, FIG. 21 illustrates that the first power source line 11 is set to be a high potential (+: Vdd), the second power source line 12 is set to be a low potential (−: Vss), and 25 and 26 are set to be a pull-up resistor; however, this configuration is merely an example. That is, for example, as described with reference to FIG. 17 to FIG. 20, it is needless to say that the configuration may be variously modified and changed.

Figure 22:
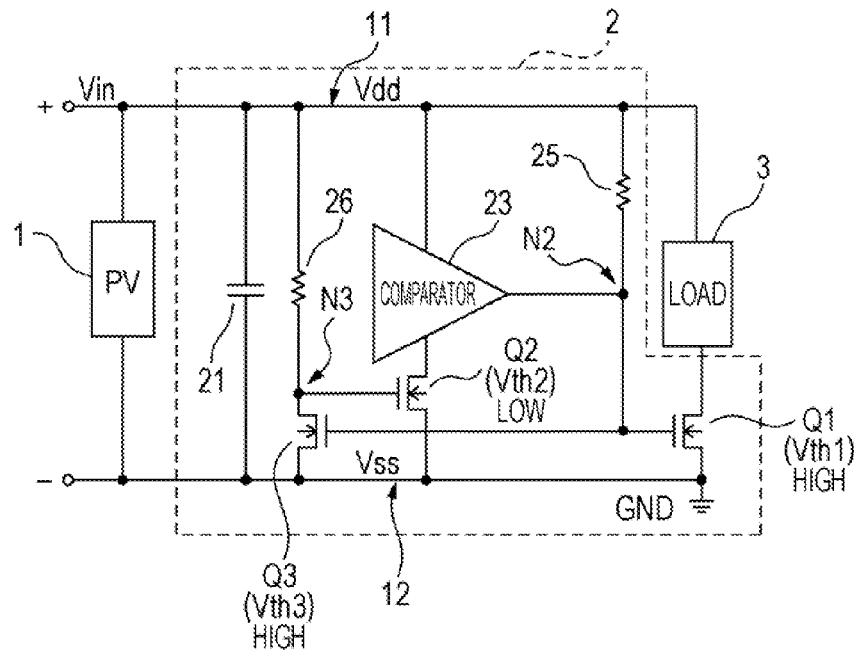
FIG. 22 is a circuit diagram illustrating one configuration example of the environmental power generation device illustrated in FIG. 21.

FIG. 22 is a circuit diagram illustrating one configuration example of the environmental power generation device illustrated in FIG. 21, and illustrates that the switching elements S1 to S3 are set to be n-type MOS transistor Q1 to Q3, Here, the first power source line 11 is connected to the high potential side (+) of the solar cell (PV) 1, and the second power source line 12 is connected to the low potential side (−) of the solar cell 1.

In addition, when the threshold voltage of the first transistor Q1 is set to be Vth1, the threshold voltage of the second transistor Q2 is set to be Vth2, and the threshold voltage of the third transistor Q3 is set to be Vth3, the relationship expressed by Vth2≤Vth3≤Vth1 is established.

That is, the threshold voltage Vth2 of the second transistor Q2 is set to be lower than or equal to the threshold voltage Vth1 of the first transistor Q1 and threshold voltage Vth3 of the third transistor Q3. In addition, the threshold voltage Vth3 of the third transistor Q3 may be set to be the same as or lower than the threshold voltage Vth1 of the first transistor Q1.

In addition, regarding the setting of the threshold voltage Vth1 to Vth3 of the transistors Q1 to Q3, it is possible to set a predetermined value by, for example, adjusting a gate width W or a gate length L of each of transistors, or controlling doping concentration of an impurity area of each of transistors.

Figure 23A:
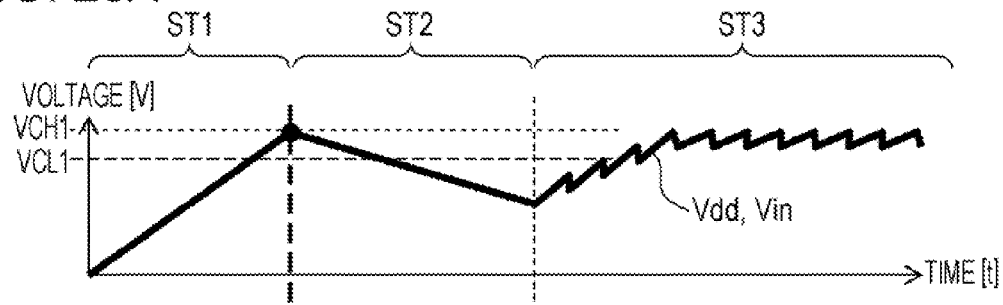
FIG. 23A and FIG. 23B are timing charts for illustrating an operation of the power control circuit in the environmental power generation device illustrate in FIG. 22.
Figure 23B:
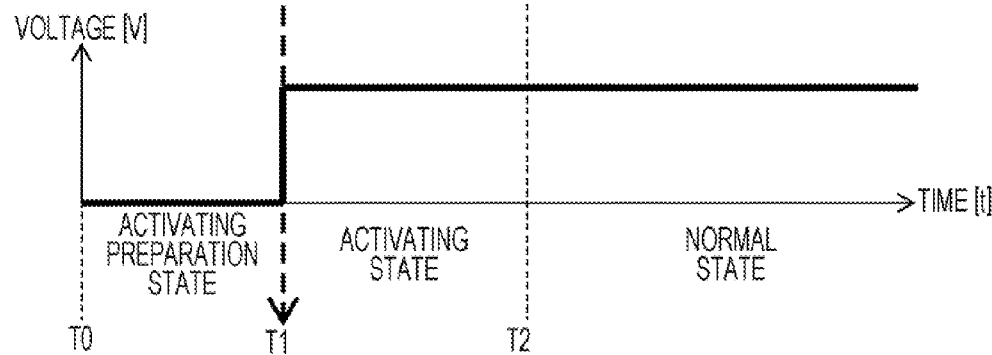

FIG. 23A and FIG. 23B are timing charts for illustrating an operation of the power control circuit in the environmental power generation device illustrated in FIG. 22. Here, FIG. 23A illustrates a state of a change of the power source voltage Vdd (Vin) over times, and FIG. 23B illustrates a change of the output of the comparator 23 (a voltage level of the node N2) over times.

Here, one example of the cases where the comparator is the hysteresis comparator will be described; however, the comparator is not limited to the hysteresis comparator. In addition, in FIG. 23A, a reference sign VCHI represent a voltage which allows the comparator (the first comparator) 23 to output the level "H", and VCLI represents a voltage which allows the comparator 23 to output the level "L".

In addition, a reference sign T0 represents an energy accumulating start time of starting to accumulate the energy from the solar cell 1 in the capacitor 21, the time T1 represents an activating start time of starting to activate the load 3, and the time T2 represents a normal state start time of starting the normal state by activating the load 3.

In addition, a reference sign ST1 represents the activating preparation state during a period from an energy accumulating start time T0 to the activating start time T1, ST2 represents the activating state during a period from the activating start time T1 to the normal state start time T2, and ST3 represents the normal state after the normal state start time T2.

As illustrated in FIG. 23A and FIG. 23B, in an initial state (T0), the output of the comparator 23 is the level "L", and the transistor Q1 is turned off. As time passes, the power generation energy from the solar cell 1 is accumulated in the capacitor 21, and in the power source voltage Vdd (Vin) is gradually increased, and thus the transistor Q2 is turned on such that the comparator 23 is operated, and in the capacitor 21 becomes greater than the voltage VCH1 (threshold voltage, Vref).

When the power source voltage Vdd is greater (equal to or higher than VCH1: T1) than the VCH1 (the first reference voltage), the output of the comparator 23 is changed from the level "L" to the level "H". The transistor Q1 is switched from OFF to ON. When the transistor Q1 is turned on, the power source line 12 is connected to the other end of the load 3, and the power source voltage Vdd is applied to the load 3.

In addition, the output of the comparator 23 is changed from the level "L" to the level "H", the transistor Q3 is also switched from OFF to ON, and the gate (node N3) of the transistor Q2 is changed from the level "H" to the level "L", and the transistor Q2 is turned off.

Here, if the threshold voltage Vth3 is set to be lower than the threshold voltage Vth1 (here, set to be higher than the threshold voltage Vth2), when the output of the comparator 23 is changed to the level "H" (before the transistor Q1 is turned on), the transistor Q3 is immediately turned off so as to stop the operation of the comparator 23. That is, it is possible to surely suppress the occurrence of the chattering by stopping the operation of the comparator 23 before the power source voltage Vdd is applied to the load 3, and thus the power source voltage Vdd starts to be decreased.

With this, the comparator 23 stops the operation, and the output of the comparator 23 (node N2) becomes to be level "H" by the pull-up resistor 25. As a result, it is possible to suppress the occurrence of the chattering due to the level of the output of the comparator 23 which is changed such as level "L"→level "H"→level "L"→ . . . .

That is, in the activating preparation state ST1, the power source voltage Vdd is gradually increased from the time T0, and firstly, when the power source voltage Vdd is greater than the second threshold voltage Vth2, the second transistor Q2 is turned on so as to start the operation of the comparator 23. In addition, in the activating preparation state ST1, the first and third transistors Q1 and Q3 are maintained to be in off state.

Further, in the time T1, the power source voltage Vdd is greater than VCH1, the output of the comparator 23 is changed from the level "L" to the level "H", and the transistor Q1 is turned on so as to start the operation of the load 3, and when the transistor Q3 is turned on, the transistor Q2 is turned off. As a result, the power source voltage Vdd is applied to the load 3, and the comparator 23 stops the operation.

That is, in the activating state ST1 from the time T1, since the comparator 23 stops the operation, the output node N2 of the comparator 23 is maintained at the level "H" by the pull-up resistor 25, and the transistors Q1 and Q3 are maintained to be on state.

Accordingly, for example, even when the power source voltage Vdd is lower (equal to or lower than VCL1) than VCL1 (the second reference voltage), the comparator 23 enters the normal state ST3 from the time T2 while remaining in the off state with the output of the node N2 being maintained to be at the level "H".

In addition, in a case where the hysteresis comparator is not used, the VCL1 and the VCH1 have the same voltage. That is, since the comparator 23 stops the operation in the activating state ST1 from the time T1, the output node N2 of the comparator 23 is maintained to be at the level "H" by the pull-up resistor 25, and the transistors Q1 and Q3 are maintained to be on state.

Accordingly, for example, even when the power source voltage Vdd is lower than the VCH1, the comparator 23 enters the normal state ST3 from the time T2 while remaining in the off state with the output of the node N2 being maintained to be at the level "H".

Note that, in the above-described fifth embodiment, the threshold voltages Vth1, Vth2, and Vth3 of the transistors Q1, Q2, and Q3 are set such that the relationship expressed by Vth2<Vth3≤Vth1 is established; however, the setting of threshold voltage for each transistor is merely an example.

In this way, according to the embodiment, it is possible to suppress the occurrence of chattering in such a manner that the power source filter 127 described with reference to FIG. 8 is not provided, the signal CS01 (the pin Pin0) described with reference to FIG. 6 and FIG. 8 is not used, and the comparator is not limited to the hysteresis comparator.

Figure 24:
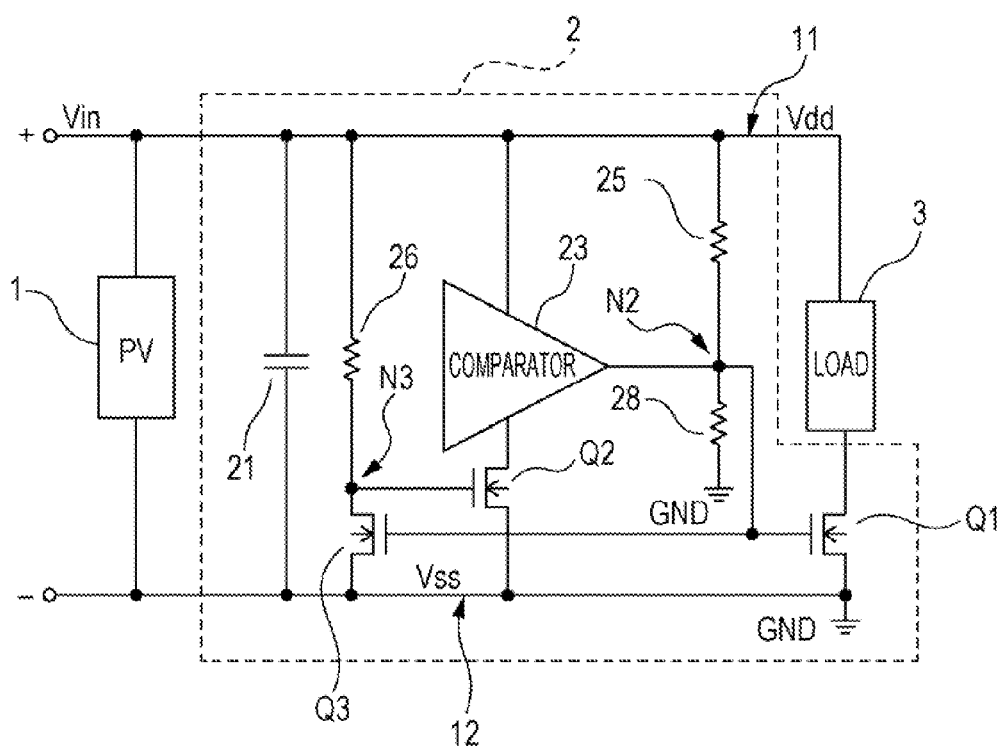
FIG. 24 is a circuit diagram illustrating a Modification Example of the environmental power generation device illustrated in FIG. 22.

FIG. 24 is a circuit diagram illustrating Modification Example of the environmental power generation device illustrated in FIG. 22. As apparent from the comparison of FIG. 24 and FIG. 22 described above, in the present Modification Example, a threshold setting resistor 28 is provided between the output (the node N2) of the comparator (the first comparator) 23 and the low potential side power source line (Vss, GND).

That is, in Modification Example of the power control circuit in the environmental power generation device of the fifth embodiment, the n-type MOS transistors Q1 to Q3 are the same types of transistors, and the threshold voltages Vth1 to Vth3 thereof are set to be the same value.

In addition, when the resistor 28 is provided between the node N2 and the GND, the voltages applied to the gates of the transistors Q1 and Q3 is voltage-divided, and the threshold voltage Vth2 of the transistor Q2 is set equivalently to a voltage which is lower than, threshold voltages Vth1 and Vth3 of the transistors Q1 and Q3.

In this way, according to the Modification Example, the threshold voltage of the transistors Q1 to Q3 can be set to be a predetermined value without controlling the sizes (W and L) and the doping concentration for each transistor, for example.

Sixth Embodiment

Figure 25A:
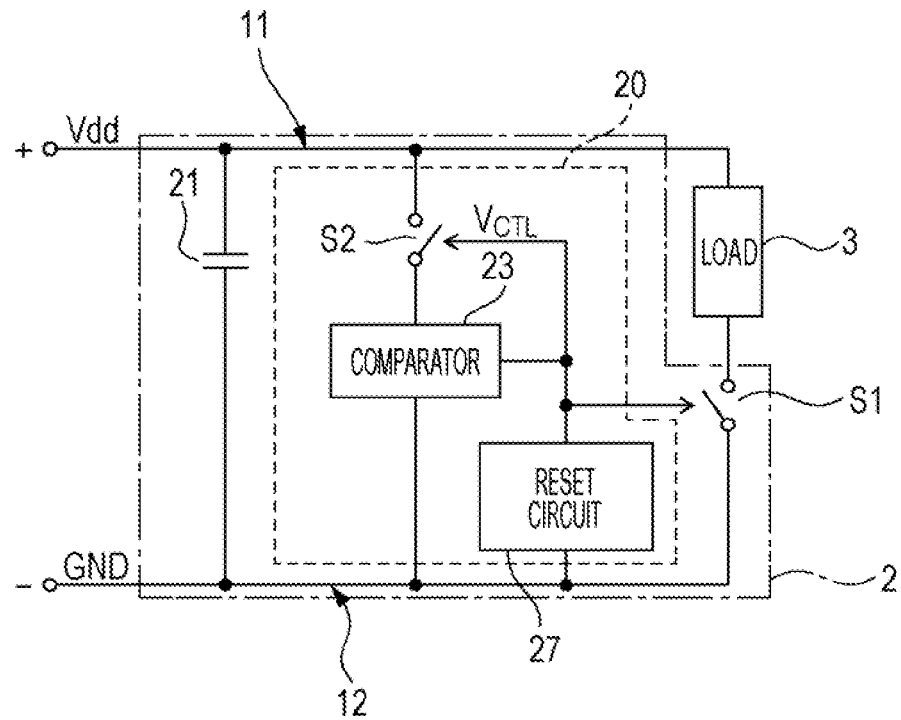
FIG. 25A and FIG. 25B are circuit diagrams illustrating an environmental power generation device in a sixth embodiment.
Figure 25B:
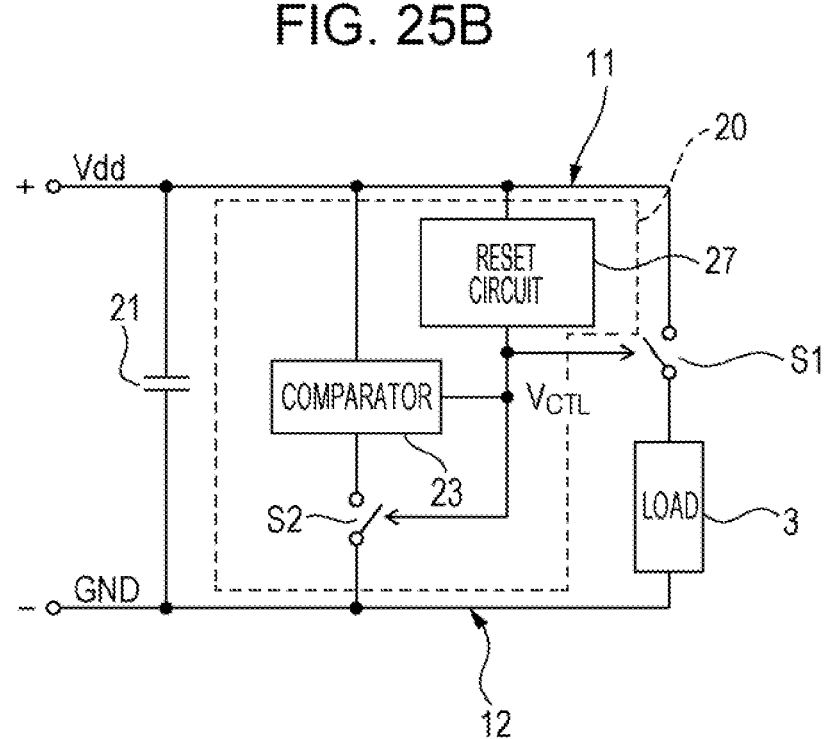

FIG. 25A and FIG. 25B are circuit diagrams illustrating the sixth embodiment of the environmental power generation device. Here, FIG. 25A illustrates that the reset circuit 27 is provided between the output of the comparator 23 and the power source line 12 in the environmental power generation device illustrated in FIG. 12A.

In addition, FIG. 25B illustrates that the reset circuit 27 is provided between the output of the comparator 23 and the power source line 11 in the environmental power generation device illustrate in FIG. 12B. The reset circuit 27 is used to; for example, manually or automatically reactivate the operation of the load 3.

Meanwhile, the reset circuit 27 in the environmental power generation device of the sixth embodiment may be applicable to the third to fifth embodiments without being limited to application described by comparing FIG. 25A and FIG. 25B with FIG. 12A and FIG. 12B with respect to the second embodiment, for example.

Figure 26:
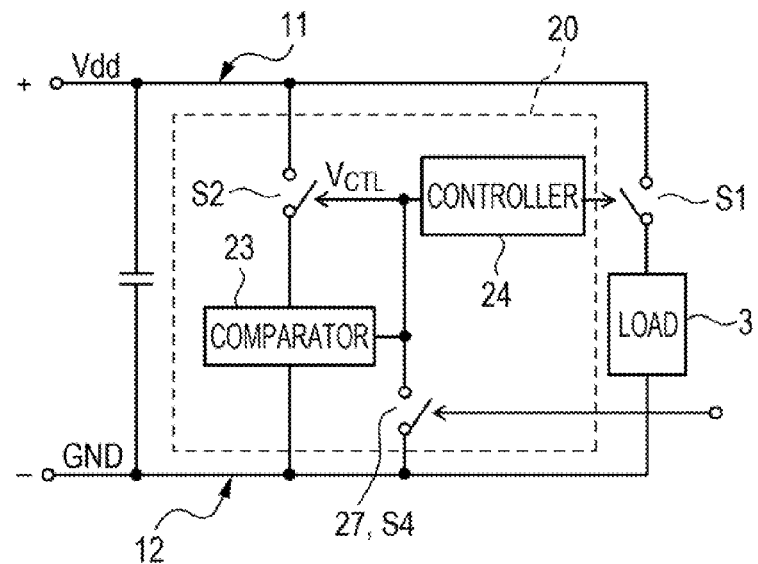
FIG. 26 is a circuit diagram illustrating one configuration example of the environmental power generation device illustrated in FIG. 25A and FIG. 25B.

FIG. 26 is a circuit diagram illustrating one configuration example of the environmental power generation device illustrated in FIG. 25, and illustrates that the reset circuit 27 in the sixth embodiment described above is applied to the environmental power generation device illustrated in FIG. 15B.

For example, as apparent from the comparison of FIG. 26 and FIG. 15B described above, in one configuration example of the sixth embodiment, the reset circuit 27 (a resetting switch: the fourth switching element S4) is provided between the output of the comparator 23 ($V_{CTL}$) and the power source line (the first power source line or the first electrode) 11. In addition, the resetting switch S4 is manually or automatically controlled to reset the application (the operation of the load 3) of the voltage with respect to the load 3.

Figure 27:
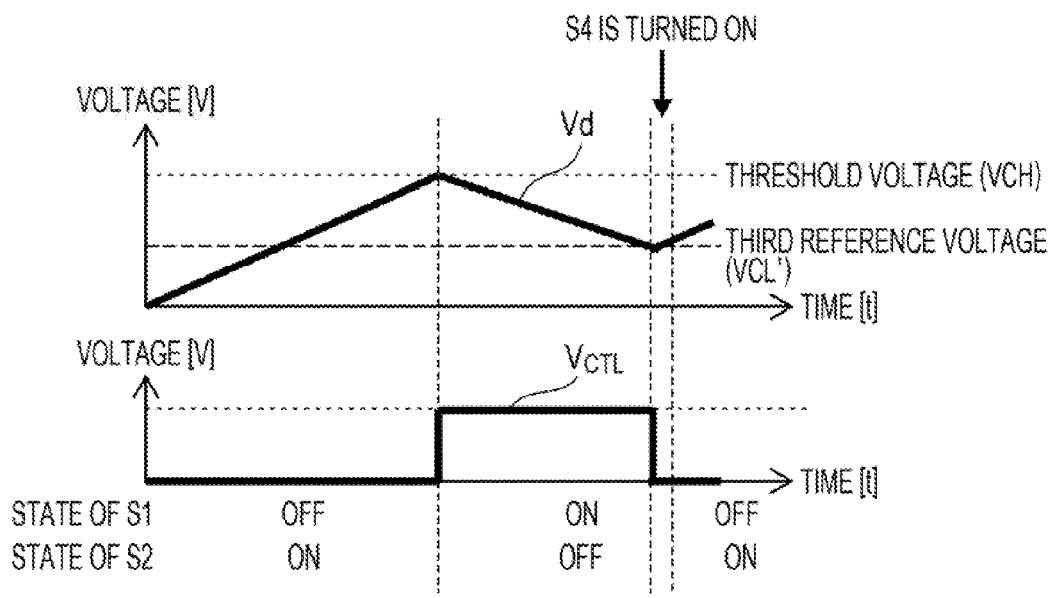
FIG. 27 is a diagram illustrating an operation of the environmental power generation device illustrated in FIG. 26.

FIG. 27 is a diagram illustrating an operation of the environmental power generation device illustrated in FIG. 26. Here, an example of the case the switching elements S1 and S2 are formed of the p-type MOS transistor and the controller 24 is formed of the inverter will be described.

As illustrated in FIG. 27, in the environmental power generation device illustrated in FIG. 26, when the differential voltage Vd (Vdd) is increased and is equal to or higher than the threshold voltage (VCH), the output of the comparator 23 (control voltage $V_{CTL}$) is changed from the level "L" to level "H".

The first switching element S1 is switched from OFF to ON by the output of the comparator 23 (level "L") which is inverted by the controller (the inverter) 24, and the second switching element S2 is switched from OFF to ON. In addition, for example, when the fourth switching element S4 (the reset circuit 27) is manually turned on, the first switching elements S1 and S2 are returned to be in the initial state, for example, the first switching element S1 is returned to be off state and the second switching element S2 is returned to be on state.

Here, for example, in a case where the third reference voltage VCL' is set in advance, and the differential voltage Vd is decreased, when the differential voltage Vd is equal to or lower than the third reference voltage VCL', the reset circuit 27 can automatically perform the reset (corresponding to turning on the fourth switching element S4).

Figure 28:
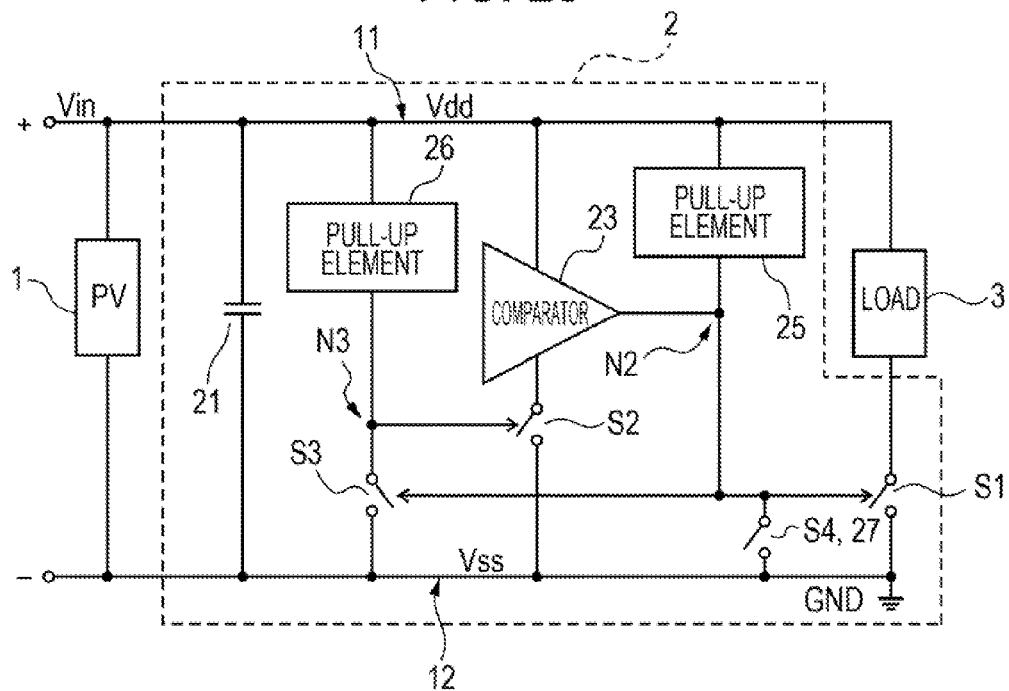
FIG. 28 is a circuit diagram illustrating another configuration example of the environmental power generation device illustrated in FIG. 25A and FIG. 25B.

FIG. 28 is a circuit diagram illustrating configuration example of the environmental power generation device illustrated in FIG. 25, illustrates that the reset circuit 27 (S4) of the sixth embodiment described above is applied to the environmental power generation device illustrated in FIG. 21. That is, in FIG. 28, the reset circuit 27 (the fourth switching element S4) is provided between the output of the comparator 23 (the node N2) and the power source line (the second power source line or the second electrode) 12 with respect to the environmental power generation device in FIG. 21.

In the power control circuit of the fifth embodiment in FIG. 21 described above, for example, once the switching element S1 is turned on, the switching element S1 is maintained to be on state. For this reason, for example, when the light is weakened, the power generation energy from the solar cell 1 is decreased, and the power source voltage Vdd (Vin) becomes lower than that of the operation of voltage of the load 3, the load 3 is not operated and thereafter, even when the light becomes strong, it is not easy to activate the load 3 again.

Alternatively, in a case where the load 3 to which the environmental power generation device (the power control circuit) is applied is for example, a device for intermittent operation such as the wireless sensor node, there is a desire to reference-activate the device, and thus the resetting switch S4 is provided.

That is, in the sixth embodiment, the resetting switch S4 is turned on, for example, the node N2 is set to be the level "L", and the switching elements S1 and S3 are turned off so as to be returned to the initial state. In addition, as described above, the operation of the resetting switch S4 may be manually performed (for example, press a reset button) by, for example, a user who periodically operates the load 3.

Seventh Embodiment

Figure 29:
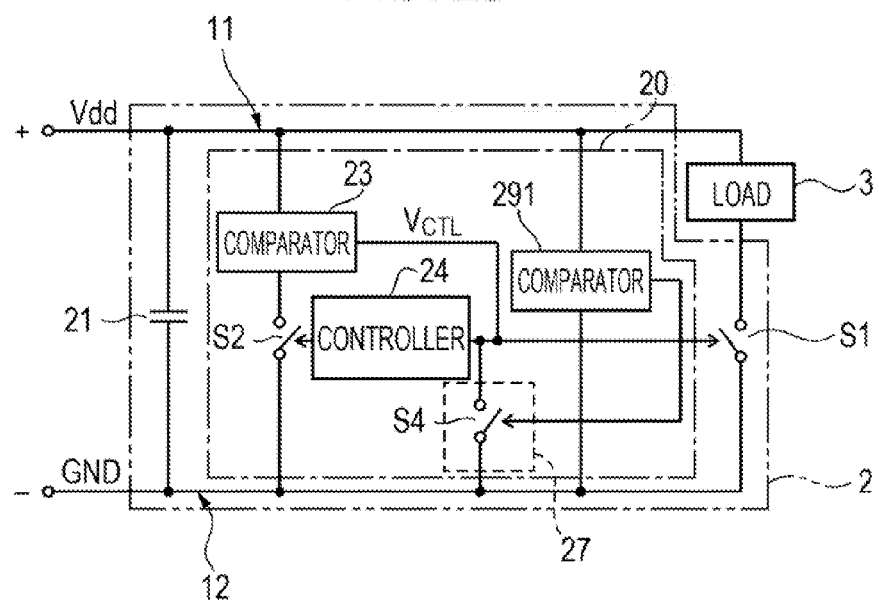
FIG. 29 is a circuit diagram illustrating an environmental power generation device in a seventh embodiment.
Figure 30:
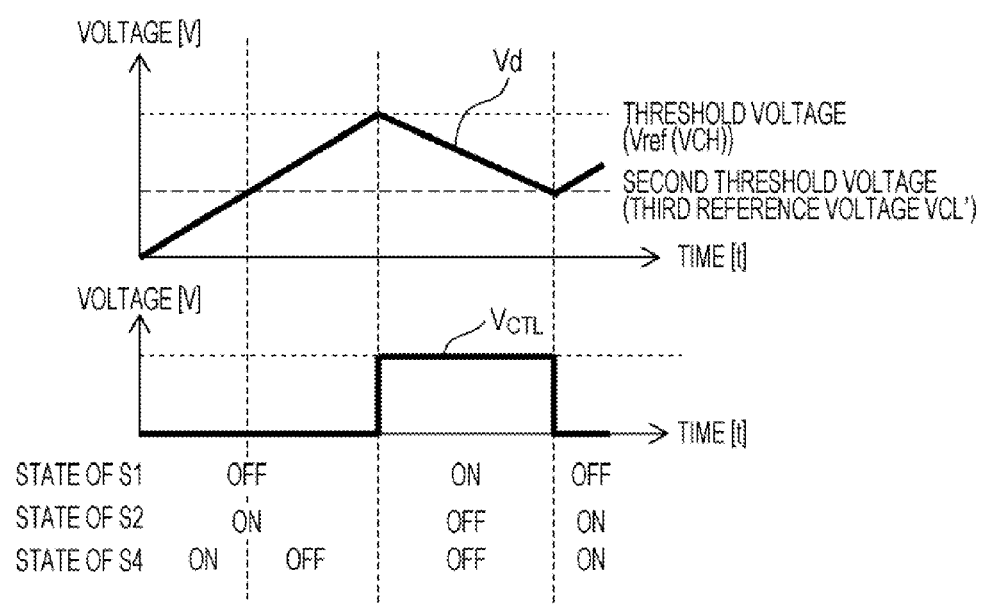
FIG. 30 is a diagram illustrating an operation of the environmental power generation device illustrated in FIG. 29.

FIG. 29 is a circuit diagram illustrating a seventh embodiment of the environmental power generation device, and FIG. 30 is a diagram illustrating an operation of the environmental power generation device illustrated in FIG. 29. That is, in the environmental power generation device of the seventh embodiment illustrated in FIG. 29, the resetting switch (the fourth switching element) S4 in the sixth embodiment is automatically controlled by the comparator (the second comparator) 291.

In addition, with respect to the environmental power generation device in FIG. 15A described above, the fourth switching element S4 and a second comparator 291 are added to the environmental power generation device illustrated in FIG. 29, and the seventh embodiment is also applicable to the various configurations of the environmental power generation device described above.

As illustrated in FIG. 29, the differential voltage monitor 20 further includes the second comparator 291 between the first and second power source lines 11 and 12, and the fourth switching element S4 is controlled to be turned on and off by the output of the second comparator 291.

As illustrated in FIG. 30, when the differential voltage Vd (the first voltage Vdd) is smaller than the second threshold voltage (the third reference voltage VCL') of the second comparator 291, the second comparator 291 turns on the reset circuit 27 (the fourth switching element S4) to be reset.

In addition, when the differential voltage Vd is greater than the second threshold voltage (VCL') the second comparator 291 turns off the fourth switching element S4 such that the power control circuit is operated. Here, the second threshold voltage (the third reference voltage VCL') of the second comparator 291 is set to be lower than threshold voltage (Vref (VCH)) of the first comparator 23.

Figure 31A:
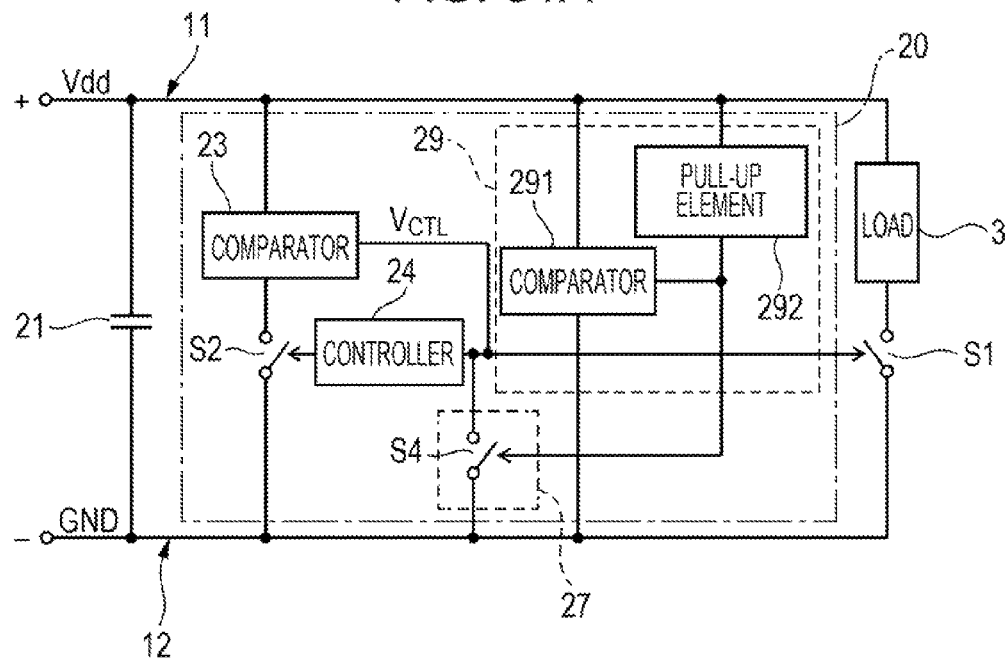
FIG. 31A and FIG. 31B are circuit diagrams illustrating a configuration example of the environmental power generation device illustrated in FIG. 29.
Figure 31B:
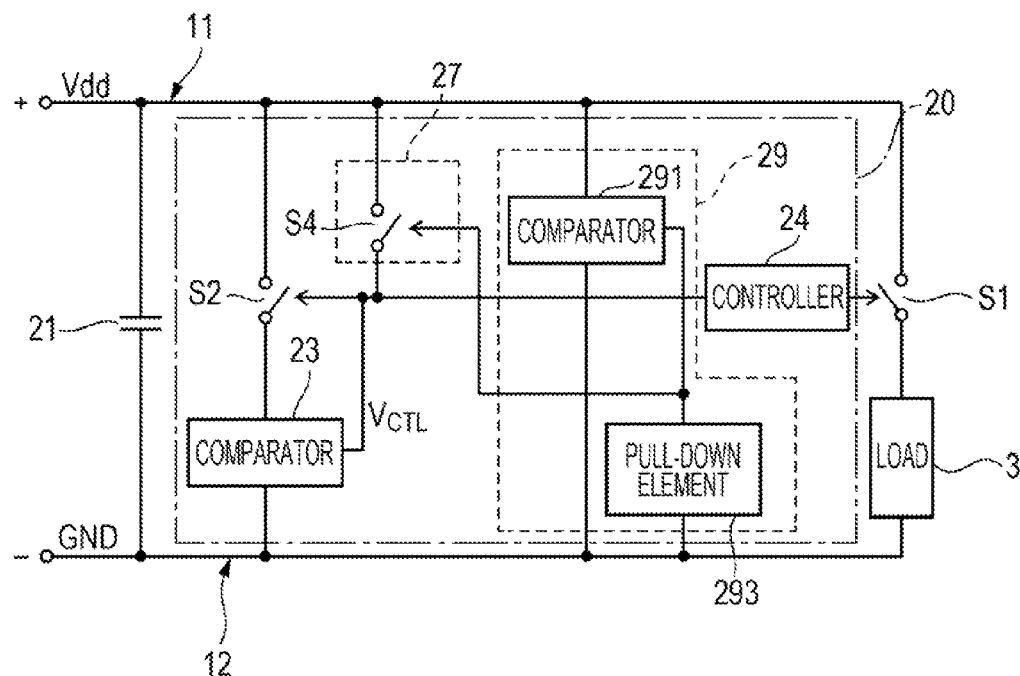

FIG. 31A and FIG. 31B are circuit diagrams illustrating a configuration example of the environmental power generation device illustrated in FIG. 29. Here FIG. 31A illustrates that a third pull-up element 292 is provided between the output of the second comparator 291 and the first power source line 11, and the pull-up element 292 is provided in the output of the comparator 291 in FIG. 29.

Further, FIG. 31B illustrates that a connection portion of the switching elements S1, S2, and S4 is changed to from the second power source line 12 in FIG. 31A to the first power source line 11, and a third pull-down element 293 is provided between the output of the second comparator 291 and the second power source line 12. In addition, in FIG. 31A and FIG. 31B, a reference sign 29 represents a reset controller for controlling the operation of the fourth switching element S4.

As illustrated in FIG. 31A, the reset circuit 27 includes the fourth switching element S4 which is provided between the output of the first comparator 23 and the second power source line 12, and the reset controller 29 includes the second comparator 291 and the third pull-up element 292.

In a case where the differential voltage Vd is decreased, when the differential voltage Vd is equal to or lower than the second threshold voltage (the third reference voltage VCL'), the reset controller 29 turns on the fourth switching element S4 so as to reset the output of the first comparator 23.

Here, in FIG. 31A, for example, the switching elements S1 and S2 can be formed of the n-type MOS transistor, the switching element S4 can be formed of the p-type MOS transistor, and the pull-up element 292 can be formed of the resistor.

As illustrated in FIG. 31B, the reset circuit 27 includes the fourth switching element S4 which is provided between the output of the first comparator 23 and the first power source line 11, and the reset controller 29 includes the second comparator 291 and the third pull-down element 293.

In a case where the differential voltage Vd is decreased, when the differential voltage Vd is equal to or lower than the second threshold voltage (VCL') the reset controller 29 turns on the fourth switching element S4 so as to reset the output of the first comparator 23. Meanwhile, again, it is needless to say that the respective embodiments may be variously modified and changed.

Figure 32:
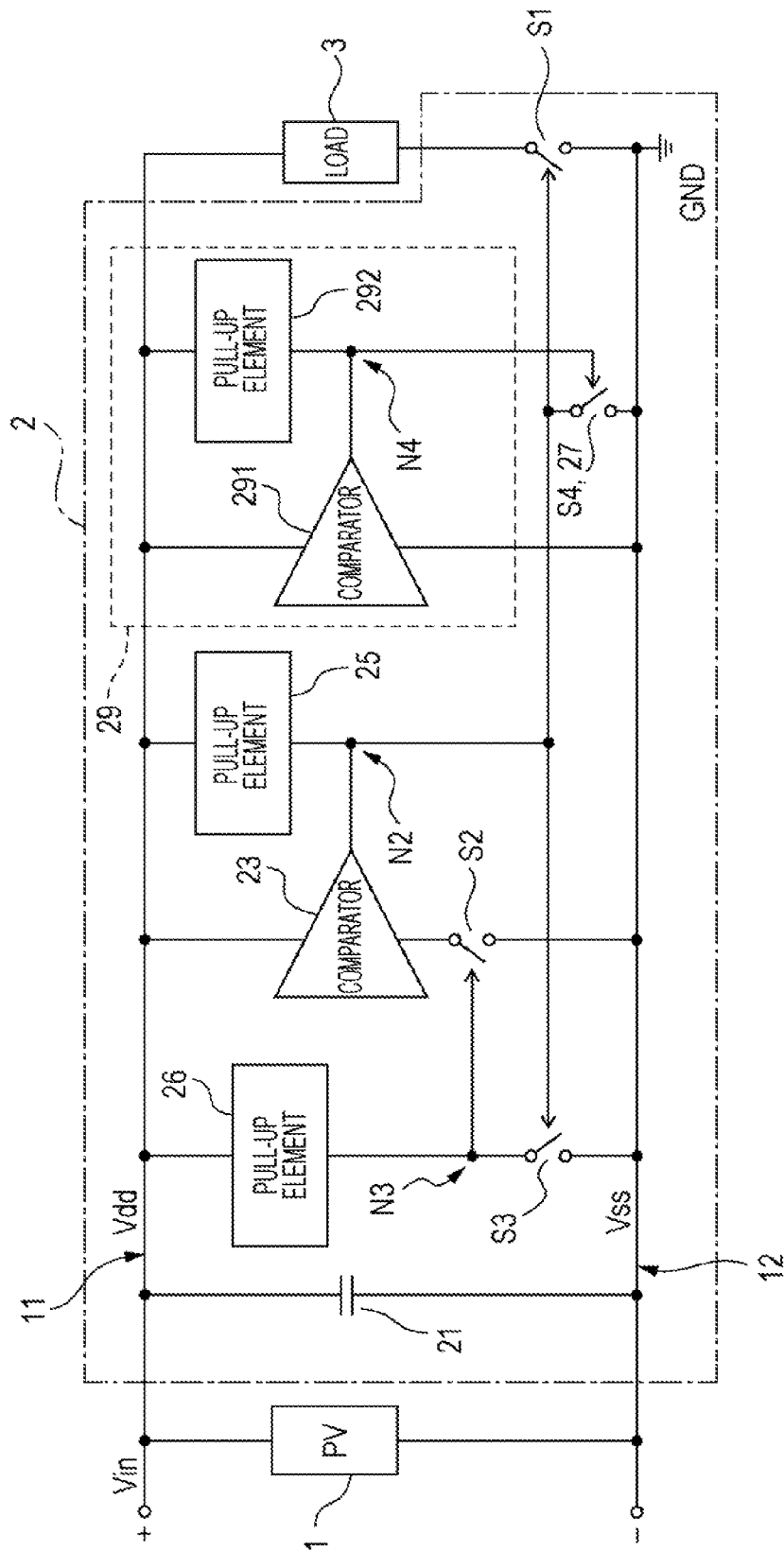
FIG. 32 is a circuit diagram illustrating a configuration example of the environmental power generation device illustrated in FIG. 28 to which the seventh embodiment is applied.

FIG. 32 is a circuit diagram illustrating a configuration example of the environmental power generation device illustrated in FIG. 28 to which the seventh embodiment is applied, and illustrates that the fourth switching element S4 (the reset circuit 27) in FIG. 28 is automatically controlled to be turned on and off by the reset controller 29 illustrated in FIG. 31A.

That is, as apparent from the comparison of FIG. 32 and FIG. 28 described above, in the configuration, in order to automatically perform a resetting process on the resetting switch (the fourth switching element) S4, the comparator (the second comparator) 291 and pull-up element (the third pull-up element) 292 are additionally provided.

The second comparator 291 compares, for example, the power source voltage Vdd with the threshold voltage Vref similar to the first comparator 23 described with reference to FIG. 21, for example, when the Vdd is greater than the Vref, the output of the second comparator 291 (the node N4) is set to be the level "L", and the resetting switch S4 is set to be turned on.

Meanwhile, the resetting switch S4 can be set to be, for example, the p-channel type MOS (pMOS) transistor. In addition, in a case where the output of the second comparator 291 is not the level "L", for example, the output of the second comparator 291 is change to the level "H" by the third pull-up element 292, and the resetting switch S4 is turned off.

In other words, according to the configuration example, for example, when the light is weakened, the power generation energy from the solar cell 1 is decreased, and the load 3 is not operated and thereafter, the light becomes strong again, S4 which is turned off by the third pull-up element 292 is reset to be turned on, for example.

In addition, according to the circuit illustrated in FIG. 32, since the S4 is turned on by the second comparator 291 so as to reset the circuit, it is possible to activate the circuit without being limited to the threshold of the S1 to S3 designated in the fifth embodiment in the FIG. 21.

Here, similar to the first comparator 23, in order to achieve the reduction in the consumption energy or avoid the occurrence of the chattering in the second comparator 291, the switching element (the fifth switching element) S5 is provided between the second comparator 291 and the second power source line 12 in the following eighth embodiment.

Eighth Embodiment

Figure 33A:
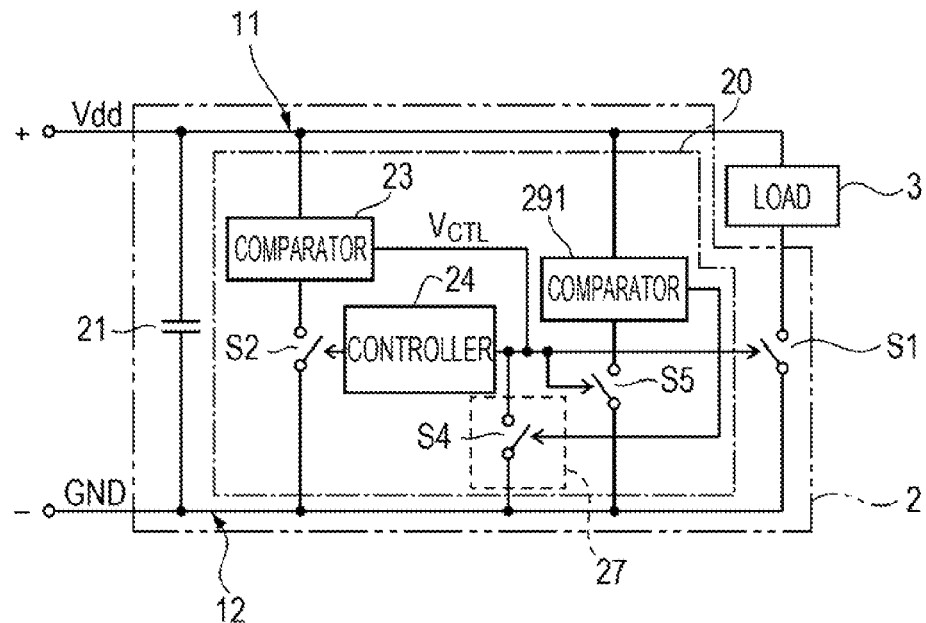
FIG. 33A and FIG. 33B are diagrams for illustrating one configuration example an environmental power generation device in an eighth embodiment.
Figure 33B:
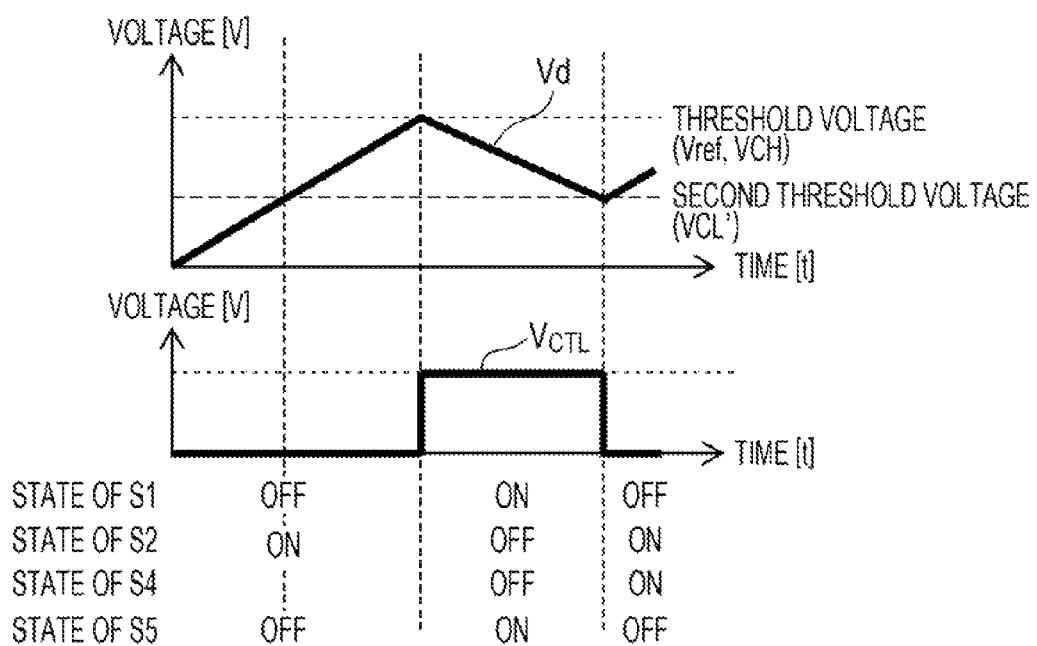

FIG. 33A and FIG. 33B are diagrams for illustrating one configuration example of an environmental power generation device of an eighth embodiment. As apparent from the comparison of FIG. 33A and FIG. 29 described above, in the configuration example, a fifth switching element S5 is provided the second comparator 291 and the second power source line 12 in the environmental power generation device illustrated in FIG. 29. In addition, the fifth switching element S5 is controlled to be turned on and off by the output of the first comparator 23.

Incidentally, the second comparator 291 controls the switching element S4 so as to reset the environmental power generation device, and according to the configuration example, when the reset operation does not have to be performed, the switching element S5 is turned off so as to stop the second comparator 291, thereby achieving the reduction of the consumption energy.

That is, as illustrated in FIG. 33B, for example, the fifth switching element S5 becomes on state or off state similar to the first switching element S1, and thus when the S1 is turned on and the operation of the load 3 is stopped, the S5 is also turned off so as to stop the operation of the second comparator 291.

Figure 34A:
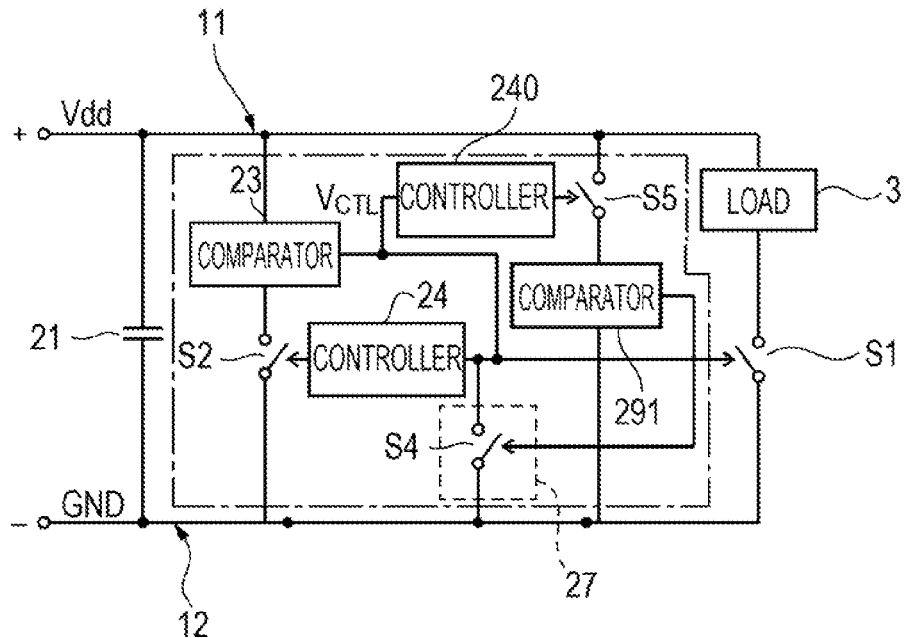
FIG. 34A and FIG. 34B are diagrams for illustrating another configuration example of an environmental power generation device in the eighth embodiment.
Figure 34B:
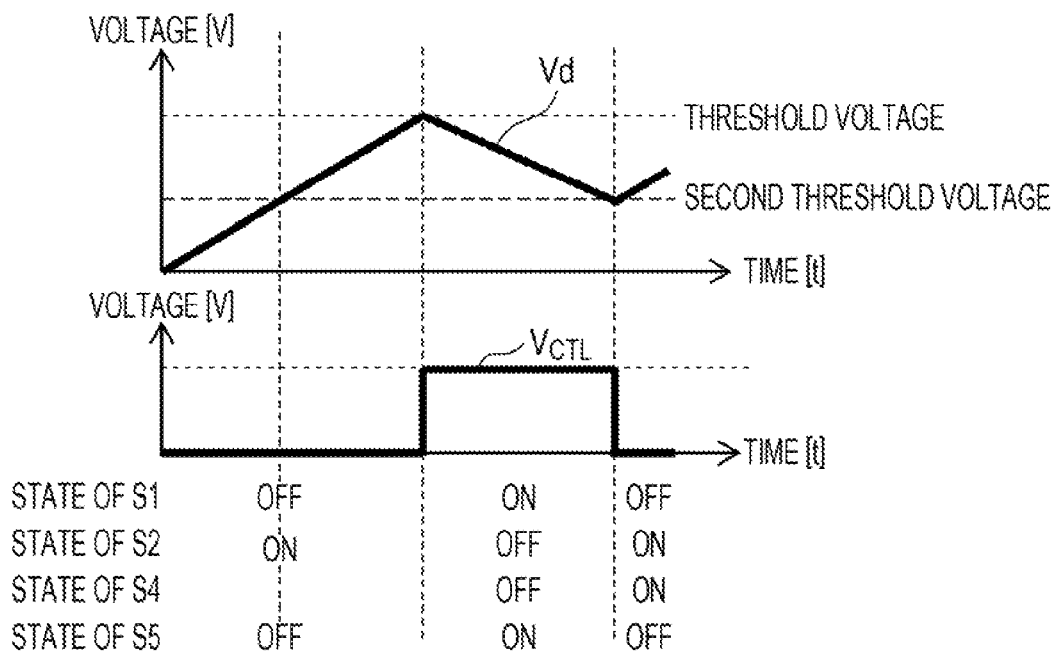

FIG. 34A and FIG. 34B diagrams for illustrating another configuration example of the environmental power generation device in the eighth embodiment, and illustrates that the fifth switching element S5 is provided be4t the second comparator 291 and the first power source line 11.

In addition, in FIG. 34A, the fifth switching element S5 is controlled by the output of the first comparator 23 via a control circuit 240; however, it is needless to say that such a modification is properly performed in accordance with, for example, a conductive transistor which applied as the switching element.

As apparent from the comparison of FIG. 34B and FIG. 33B, in the configuration example, the fifth switching element S5 becomes the on/off state in the same manner as the first switching element S1, and thus, when the operation of the load 3 stops, the operation of the second comparator 291 also stops.

Ninth Embodiment

Figure 35:
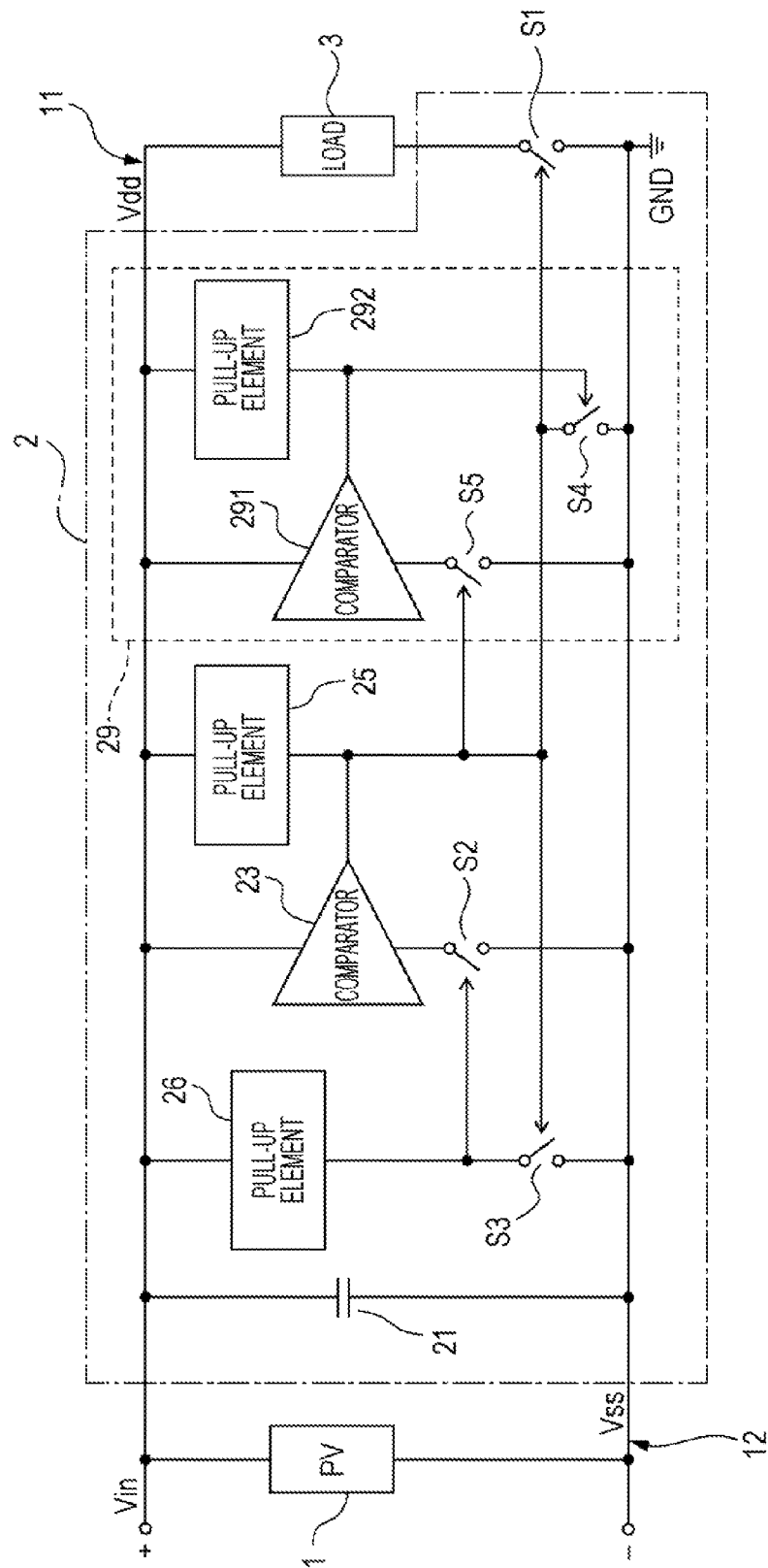
FIG. 35 is a circuit diagram illustrating an environmental power generation device in a ninth embodiment.

FIG. 35 is a circuit diagram illustrating a ninth embodiment of the environmental power generation device. As apparent from the comparison of FIG. 35 and FIG. 32 described above, in the ninth embodiment, the fifth switching element S5 is provided between the second comparator 291 and the second power source line 12, and is controlled by the output of the first comparator 23.

That is, the environmental power generation device of the ninth embodiment illustrated in FIG. 35 applies the eighth embodiment to the environmental power generation device illustrated in FIG. 32. That is, in the environmental power generation device illustrated in FIG. 32, the second comparator 291 continuously operates, in addition to performing a reset operation, and thus consumption energy is wasted.

Therefore, in the ninth embodiment, when the output of the first comparator 23 is a level "L", S5 is turned off so as to stop the operation of the second comparator 291, and when the output of the first comparator 23 is a level "H", S5 is turned on, so as to operate the second comparator 291. In this way, in the ninth embodiment, when the reset operation does not have to be performed, the reduction of the consumption energy is achieved by stopping the second comparator 291.

Figure 36:
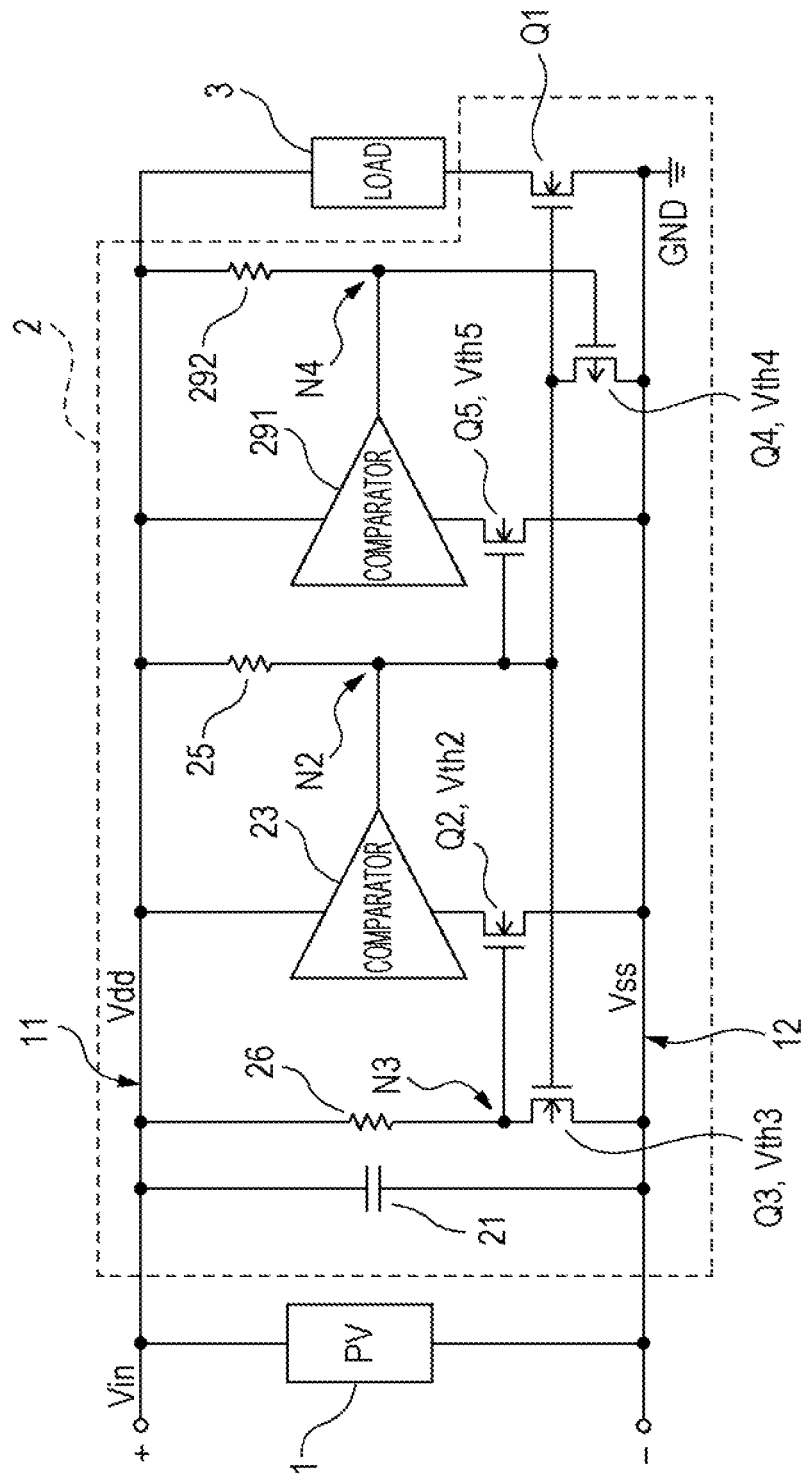
FIG. 36 is a circuit diagram illustrating one configuration example of the environmental power generation device illustrated in FIG. 35.

FIG. 36 is a circuit diagram illustrating one configuration example of the environmental power generation device illustrated in FIG. 35. As apparent from the comparison of FIG. 36 and FIG. 35 described above, the switching elements S1 to S3 and S5 are set to be the n-type MOS transistors Q1 to Q3, and Q5, and the switching element S4 is set to be the p-type MOS transistor Q4.

FIG. 37A to FIG. 37C are timing charts for illustrating an operation of the power control circuit in the environmental power generation device illustrated in FIG. 36. Here, FIG. 37A illustrates a state of a change of the power source voltage Vdd (Vin) over times, and FIG. 37B illustrates a state of a change of the output (the voltage level of the node N2) of the first comparator 23 over times. Further, FIG. 37C illustrates a state of a change of the output (the voltage level of the node N4) of the second comparator 291 over times.

In addition, in FIG. 37A, the reference sign VCHI represents a voltage at which the first comparator 23 outputs a level "H", VCLI represents a voltage at which the first comparator 23 outputs a level "L", and VCL2 represents a voltage at which the second comparator 291 outputs a level "L", Also, reference signs ST1 and ST1' represent activating preparation states, ST2 and ST2' represent activating states, and ST3 and ST3' represent normal states.

First, the operation of the power source voltage Vdd (Vin) and the first comparator 23 in the activating preparation state ST1 and the activating state ST2 is the same as described with reference to FIG. 23. That is, the solar cell 1 accumulates the power generation energy from time T0 in the capacitor 21, and, if the power source voltage Vdd exceeds the threshold voltage Vref (VCH1) in the time T1, the output of the first comparator 23 changes from the level "L" to the level "H".

As described above, threshold voltage Vth2 and Vth5 of the transistor Q2 and Q5 are set, for example, to be lower than threshold voltages Vth1 and Vth3 of the transistors Q1 and Q3, and, in the activating preparation state ST1, only the transistor Q2 is turned on, and the first comparator 23 is in an operation state.

In the activating preparation state ST1, the transistors Q1 and Q3 to Q5 are turned off, and in the activating state ST2, the transistors Q1 and Q3 and Q5 are turned on. In addition, in the activating state ST2, the transistor Q4 remaining in the off state.

At this point, as illustrated in FIG. 37C, the output (N4) of the second comparator 291 is pulled up to the first power source line 11 by the resistor 292, and thus increases similar to the power source voltage Vdd in the activating preparation state ST1 becomes the level "H" in the time T1, and maintains the level "H".

Also, at the time TI, the output of the first comparator 23 becomes the level "H", and if the transistor Q3 is turned on, the transistor Q2 is turned off, such that the comparator 23 stops an operation. In addition, the application of the power source voltage Vdd to the load 3 and the operation of the comparator 291 are continuously performed.

In addition, at the time T2, if the load 3 ends the activating state ST2 and enters the normal state ST3, the power source voltage Vdd increases by the power generation energy from the solar cell 1. For example, the load 3 wirelessly performs transmission and reception of data or various signals between the base stations in the normal state ST3.

Also, for example, in the period AP from the time T3 to the time T5, if light becomes weak and the power generation energy from the solar cell 1 decreases, the power source voltage Vdd also decreases, accordingly. Also, at the time T4, if the power source voltage Vdd decreases by the voltage VCL2, the output (N4) of the second comparator 291 changes from the level "H" to the level "L".

At the time T4, if the node N4 changes from the level "H" to the level "L", the p-type MOS transistor Q4 is turned on so as to perform a reset operation. That is, if the output (N2) of the first comparator 23 is connected to the second power source line 12, the node N2 changes from the level "H" to the level "L", the transistors Q1 and Q3 are turned off, and returns to the initial state of the time T0. At this point, the transistor Q5 is also turned off, and accordingly the operation of the second comparator 291 stops.

The operations of the activating preparation state ST1' the activating state ST2', and the normal state ST3' after the time T5 (T4) are the same as the operations of ST1, ST2, and ST3, described above. In this way, according to the ninth embodiment, while the occurrence of the chattering is suppressed, and while the increase of the consumption energy is suppressed, it is possible to perform the reset process automatically.

Tenth Embodiment

Figure 38A:
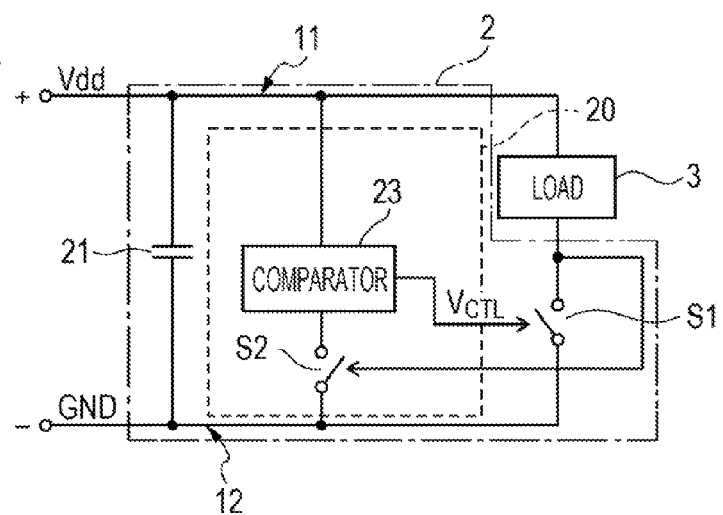
FIG. 38A to FIG. 38C are circuit diagrams illustrating an environmental power generation device in a tenth embodiment.
Figure 38B:
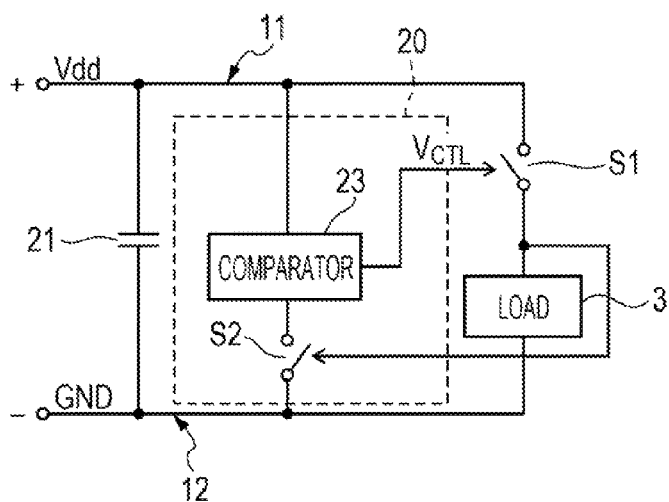
Figure 38C:
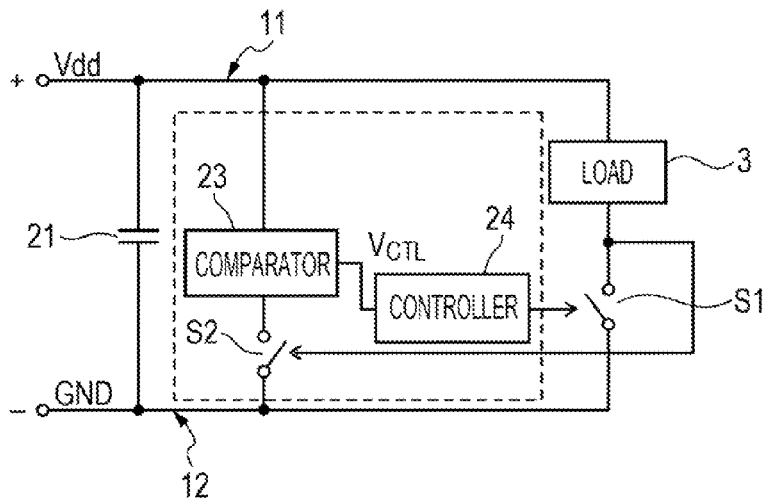

FIG. 38A to FIG. 38C are circuit diagrams illustrating a tenth embodiment of the environmental power generation device. Here, in FIG. 38A and FIG. 38C, the load 3 is connected to the first power source line (the high potential side power source line or the first electrode) 11, and in FIG. 38B, the load 3 is connected to the second power source line (the low potential side power source line or the second electrode) 12. In addition, in FIG. 38C, the controller 24 is provided between the first comparator 23 and the first switching element S1.

As illustrated in FIG. 38A to FIG. 38C, in the environmental power generation device of the tenth embodiment, the voltage of the connection node between the first switching element S1 and the load 3 is detected so as to control the second switching element S2. In addition, FIG. 38A to FIG. 38C are merely configuration examples, and the tenth embodiment can be applied to other various configurations.

Here, as an example of FIG. 38A, operation principles are described. In FIG. 38A, S1 is initially in an off state. If Vdd increases, the voltage of the node connected to the load 3 increases and exceeds the threshold voltage of S2, S2 is turned on. If the differential voltage of Vdd and GND exceeds the threshold of the comparator 23, the output $V_{CTL}$ of the comparator changes from the level "L" to the level "H", and S1 is turned on. If the voltage of the node connected to the load 3 becomes GND, the load 3 activates and simultaneously S2 is turned off, the operation of the comparator 23 stops.

That is, according to the tenth embodiment, the both voltages of the first switching element S1 or the load 3 are detected, the operation state of the load 3 is detected, and the on/off control of the second switching element S2 is performed based on the detected operation of the load 3. Accordingly, an appropriate control based on the voltage applied to the load 3 can be performed.

Eleventh Embodiment

Figure 39A:
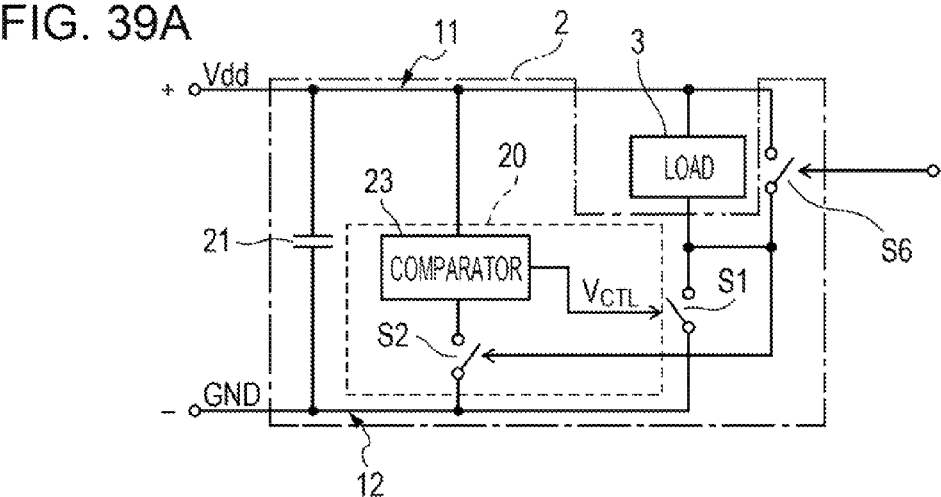
FIG. 39A to FIG. 39C are circuit diagrams illustrating an environmental power generation device in an eleventh embodiment.
Figure 39B:
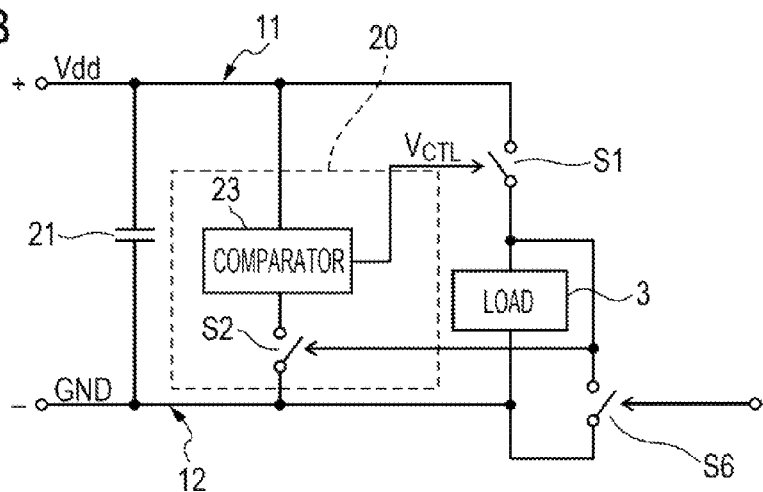
Figure 39C:
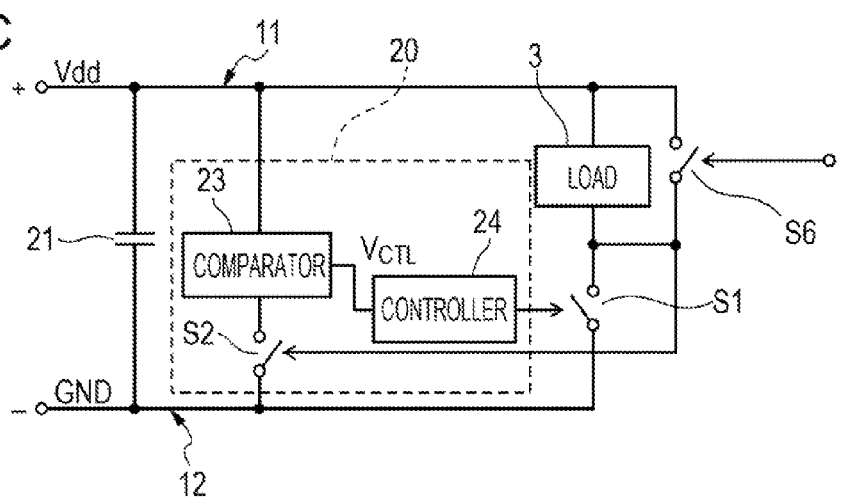

FIG. 39A to FIG. 39C are circuit diagrams illustrating an eleventh embodiment of the environmental power generation device. Here, with respect to the configuration example of the tenth embodiment illustrated in FIG. 38A to FIG. 38C described above, FIG. 39A to FIG. 39C additionally illustrate that a sixth switching element S6 is provided parallel with each of the loads 3.

In addition, S6 is a resetting switch and is operated based on, for example, a signal from the outside. Note that, FIG. 39A to FIG. 39C are merely configuration examples, and the eleventh embodiment can be applied to other various configurations.

As illustrated in FIG. 39A to FIG. 39C, the environmental power generation device of the eleventh embodiment is provided with the sixth switching element S6 in parallel to the load 3, the second switching element S2 is reset by turning on the sixth switching element S6 when the load 3 does not perform an operation.

Twelfth Embodiment

Figure 40A:
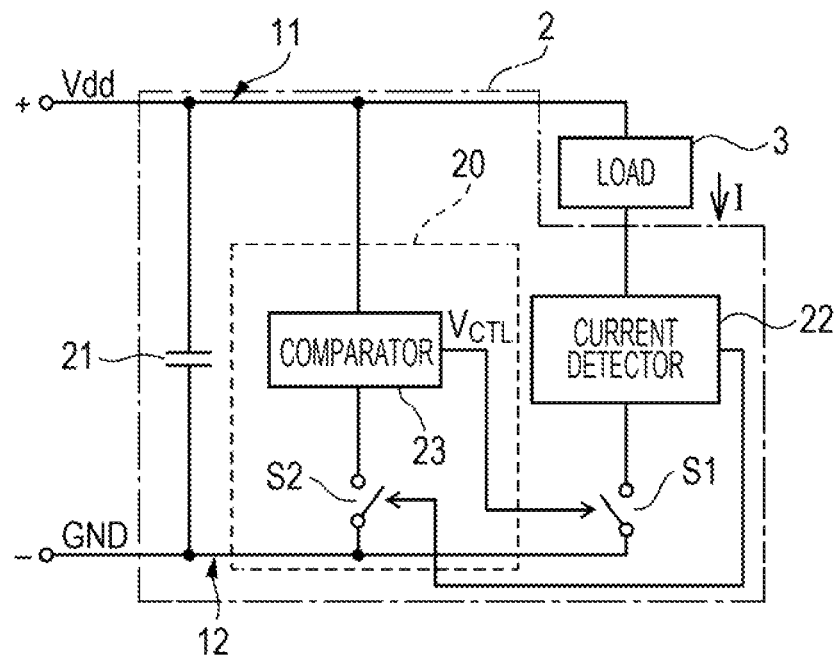
FIG. 40A and FIG. 40B are circuit diagrams illustrating an environmental power generation device in a twelfth embodiment.
Figure 40B:
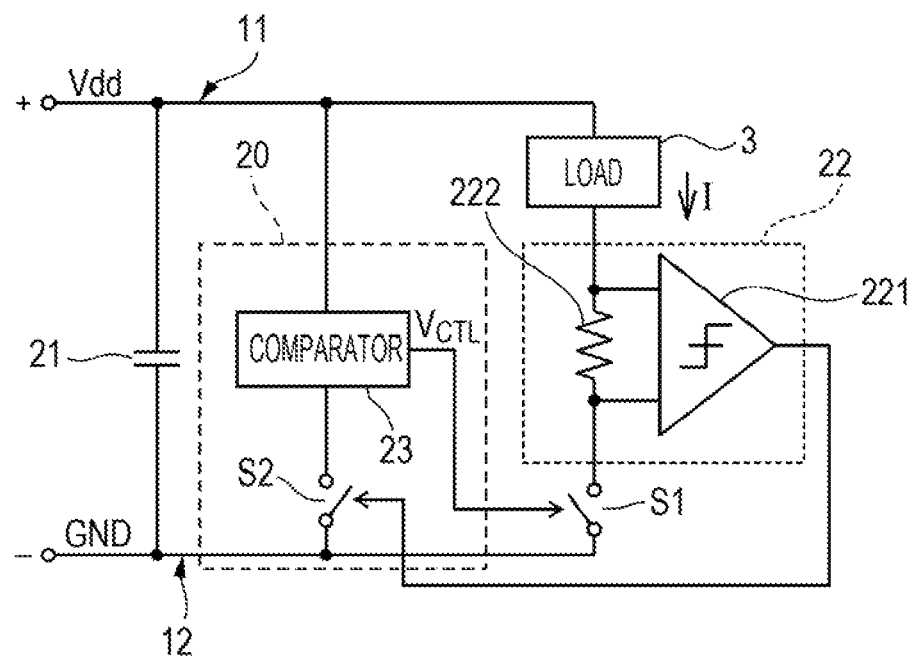

FIG. 40A and FIG. 40B are circuit diagrams illustrating a twelfth embodiment of the environmental power generation device, FIG. 40A illustrates a circuit example of the environmental power generation device according to the twelfth embodiment, FIG. 40B illustrates one configuration example of a current detector 22 in FIG. 40A.

As illustrated in FIG. 40A, the environmental power generation device according to the twelfth embodiment provides the current detector 22 in series of the load 3 and the first switching element S1, and the current flowing through the load 3 is detected by the current detector 22.

Here, as illustrated in FIG. 40B, the current detector 22 can be formed, for example, by providing the current detection resistor 222 between the load 3 and the first switching element Si and the comparator (the third comparator) 221 that compares voltages on both ends of the resistor 222.

Also, if a current I flowing through the load 3 detected by the current detector 22 is equal to or greater than a certain current value Io, the second switching element S2 is controlled to be turned off, and if the current I is smaller than a certain current value Io, the second switching element S2 is controlled to be turned on.

That is, similar to the twelfth embodiment, it is possible to perform an on/off control of the second switching element S2 based on the current flowing through the load 3. In addition, the current detector 22 illustrated in FIG. 40B is merely an example, and the embodiments are not limited thereto.

Thirteenth embodiment

Figure 41A:
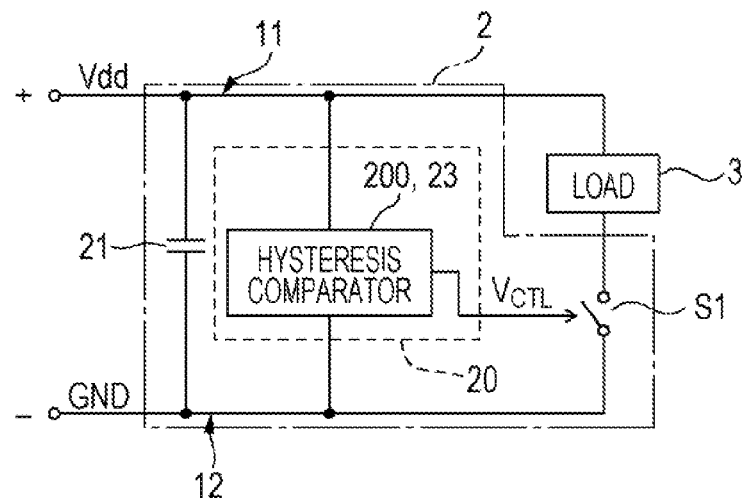
FIG. 41A and FIG. 41B are diagrams for illustrating a configuration example of an environmental power generation device in a thirteenth embodiment.
Figure 41B:
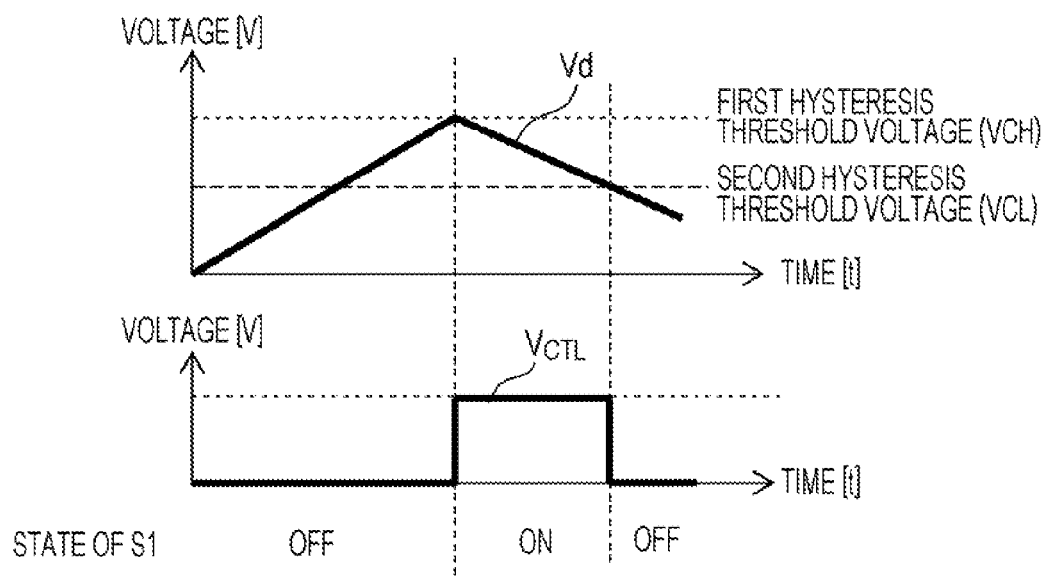

FIG. 41A and FIG. 41B are diagrams for illustrating a configuration example of a thirteenth embodiment of the environmental power generation device, and FIG. 41A and FIG. 41B illustrate a circuit configuration of the environmental power generation device in the thirteenth embodiment.

As illustrated in FIG. 41A, the thirteenth embodiment the first comparator 23 in the differential voltage monitor 20 of the respective embodiments is formed of the hysteresis comparator 200 in the environmental power generation device.

Here, the hysteresis comparator 200 sets, for example, a first hysteresis threshold voltage (a voltage which is changed from the level "L" to the level "H") to be the same as the upper limit voltage (for example, the first reference voltage VCH) which enables the load 3 to be operated, or to be lower than the upper limit voltage.

Further, the hysteresis comparator 200 sets, for example, a second hysteresis threshold voltage (a voltage which is changed from the level "H" to the level "L") to be the same as the lower limit voltage (for example, the second reference voltage VCL) which enables the load 3 to be operated, or to be higher than the lower limit voltage.

In addition, FIG. 41B illustrates a case where the first hysteresis threshold voltage is set to be the upper limit voltage (VCH) which enables the load 3 to be operated, and the second hysteresis threshold voltage is set to be the lower limit voltage (VCL) which enables the load 3 to be operated.

In this way, the environmental power generation device in the respective embodiments can be variously formed. In addition, it is needless to say that the above-described embodiments and configuration examples are merely an example, and the configuration of the environmental power generation device may be variously modified and changed.

As described above, the power control circuit in the embodiment can be provided as a semiconductor integrated circuit which is formed on a semiconductor substrate. In addition to the solar cell which is the photovoltaic generator using light energy, for example, a vibration power generator or a heat generator which use vibration and heat from a machine and a human body, or an electromagnetic wave generator using electromagnetic wave energy can be widely applied to the energy harvester.

Further, from the wireless sensor node of the wireless sensor network, various electronic circuits and electronic devices can be widely applied to the load 3 to which the environmental power generation device in the embodiment is applied.

All examples and conditional language recited herein are intended for pedagogical purposes to aid the reader in understanding the invention and the concepts contributed by the inventor to furthering the art, and are to be construed as being without limitation to such specifically recited examples and conditions nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power control circuit comprising:
a first electrode to which a first voltage is applied;
a second electrode to which a second voltage different from the first voltage is applied;
a capacitor connected between the first electrode and the second electrode;
a first switching element arranged between the first electrode and the second electrode and connected to a load in series; and
a differential voltage monitor configured to monitor a differential voltage between the first voltage and the second voltage, and control the first switching element to be turned on and off,
wherein the differential voltage monitor controls the first switching element in such a manner that
in a case where the differential voltage is increased,
when the differential voltage is lower than a first reference voltage, the first switching element is turned off, and
when the differential voltage is equal to or higher than the first reference voltage, the first switching element is turned on, and
in a case where the differential voltage is decreased,
when the differential voltage is higher than a second reference voltage, the first switching element is turned on, and
when the differential voltage is equal to or lower than the second reference voltage, the first switching element is turned off.

2. The power control circuit according to claim 1,
wherein the first reference voltage is greater than the second reference voltage,
wherein the first reference voltage is equal to or lower than an upper limit voltage to enable an operation of the load, and
wherein the second reference voltage is equal to or greater than a lower limit voltage to enable an operation of the load.

3. The power control circuit according to claim 2,
wherein the differential voltage monitor includes a first comparator and a second switching element that are arranged between the first electrode and the second electrode and are connected in series, and
wherein the first switching element and the second switching element are controlled by the first comparator.

4. The power control circuit according to claim 3,
wherein the differential voltage monitor further includes a controller arranged between an output terminal of the first comparator and at least one of the first switching element and the second switching element, the controller including any one pair, arranged between the first electrode and the second electrode in series, of a third switching element and a first pull-up element, the third switching element and a first pull-down element, and the third switching element and a complementary switching element to work as an inverter.

5. The power control circuit according to claim 4,
wherein the controller includes the third switching element and the first pull-up element arranged between the first electrode and the second electrode in series, and wherein the differential voltage monitor further includes a second pull-up element arranged between the output terminal of the first comparator and a high potential electrode in the first electrode and the second electrode.

6. The power control circuit according to claim 5, wherein the differential voltage monitor further includes a threshold setting resistor connected to the output terminal of the first comparator and the second electrode, wherein the first pull-up element and the second pull-up element are resistors, wherein the first, second, and third switching elements are first, second, and third n-channel type MOS transistors having the same size, respectively, and wherein due to the threshold setting resistor, a second threshold voltage of the second switching element is set to a voltage lower than a first threshold voltage of the first switching element and a third threshold voltage of the third switching element.

7. The power control circuit according to claim 4, wherein the controller includes the third switching element and the first pull-down element arranged between the first electrode and the second electrode in series, and wherein the differential voltage monitor further includes a second pull-down element arranged between the output terminal of the first comparator and a low potential electrode in the first electrode and the second electrode.

8. The power control circuit according to claim 4, wherein the first switching element and the third switching element are controlled to be turned on and off by the first comparator, and wherein the second switching element is switched from ON state to OFF state when the third switching element is switched from OFF state to ON state.

9. The power control circuit according to claim 4, wherein an absolute value of a second threshold which allows the second witching element to be turned on and off is smaller than or equal to an absolute value of a first threshold which allows the first switching element to be turned on and off and an absolute value of a third threshold which allows the third switching element to be turned on and off, and wherein the absolute value of the third threshold is smaller than equal to the absolute value of the first threshold.

10. The power control circuit according to claim 4, wherein the first comparator allows the first switching element and the third switching element to be turned on when a voltage is applied to the load to be greater than a predetermined threshold voltage, wherein the second switching element is switched from ON state to OFF state when the third switching element is switched from OFF state to ON state, and wherein the first, second, and third switching elements are first, second, and third n-channel type MOS transistors, respectively.

11. The power control circuit according to claim 4, wherein the controller includes the third switching element and the complementary switching element to work as the inverter, arranged between the first electrode and the second electrode in series, and wherein the second switching element is controlled by the inverter.

12. The power control circuit according to claim 3, wherein the differential voltage monitor further includes a reset circuit arranged between the output terminal of the first comparator and one of the first electrode and the second electrode, and wherein the reset circuit resets the first comparator when the differential voltage is equal to or lower than a third reference voltage in a case where the differential voltage is decreased, wherein the third reference voltage is set to be close to the lower limit voltage to enable an operation of the load.

13. The power control circuit according to claim 12, wherein the reset circuit includes a fourth switching element arranged between the output terminal of the first comparator and one of the first electrode and the second electrode, and wherein the fourth switching element is turned on when the differential voltage is equal to or lower than the third reference voltage so as to reset the first comparator in a case where the differential voltage is decreased.

14. The power control circuit according to claim 13, wherein the reset circuit further includes a second comparator arranged between the first electrode and the second electrode, wherein the fourth switching element is controlled to be turned on and off by the second comparator, and wherein the second comparator allows the fourth switching element to be turned on and the first comparator to be reset when the differential voltage is equal to or lower than a predetermined threshold voltage.

15. The power control circuit according to claim 14, wherein the differential voltage monitor further includes a fifth switching element that is connected to the second comparator in series between the first electrode and the second electrode, wherein the fifth switching element is controlled to be turned on and off by the first comparator, wherein the fourth switching element fourth p-channel type MOS transistor, wherein the fifth switching element is a fifth n-channel type MOS transistor, and wherein a fifth threshold voltage of the fifth transistor is set to a voltage which is lower than or equal to a threshold voltage of the first transistor and a threshold voltage of the third transistor.

16. The power control circuit according to claim 3, wherein voltages at both ends of one of the first switching element and the load are detected and an operation state of the load is detected, and wherein the second switching element is controlled to be turned on and off, based on the detected operation state of the load.

17. The power control circuit according to claim 3, further comprising:

a current detector arranged between the load and the first switching element, and configured to detect a current flowing through the load, wherein when the current flowing through the load is equal to or greater than a predetermined current value, the second switching element is turned off, and wherein when the current flowing through the load is smaller than the predetermined current value, the second switching element is turned on.

18. The power control circuit according to claim 17, further comprising:
a sixth switching element arranged parallel with the load,
wherein when the load is not operated, the sixth switching element is turned on so as to reset the second switching element, and
wherein the current detector includes
a current detection resistor arranged between the load and the first switching element, and
a third comparator configured to compare voltages at both ends of the current detection resistor.

19. An environmental power generation device comprising:
an environmental power generator configured to generate a first voltage and a second voltage;
a first electrode to which the first voltage is applied;
a second electrode to which the second voltage different from the first voltage is applied;
a capacitor connected between the first electrode and the second electrode;
a first switching element arranged between the first electrode and the second electrode and connected to a load in series; and
a differential voltage monitor configured to monitor a differential voltage between the first voltage and the second voltage, and control the first switching element to be turned on and off,
wherein the differential voltage monitor controls the first switching element in such a manner that
in a case where the differential voltage is increased,
when the differential voltage is lower than a first reference voltage, the first switching element is turned off, and
when the differential voltage is equal to or higher than the first reference voltage, the first switching element is turned on, and
in a case where the differential voltage is decreased,
when the differential voltage is higher than a second reference voltage, the first switching element is turned on, and
when the differential voltage is equal to or lower than the second reference voltage, the first switching element is turned off.

20. A control method of an environmental power generation device configured to include an environmental power generator to generate a first voltage and a second voltage different from the first voltage, and a power control circuit to receive the first voltage and the second voltage, the control method comprising:
in a case where a differential voltage between the first voltage and the second voltage is increased,
turning off the first switching element when the differential voltage is lower than a first reference voltage;
turning on the first switching element when the differential voltage is equal to or higher than the first reference voltage;
in a case where the differential voltage is decreased,
turning on the first switching element when the differential voltage is higher than a second reference voltage; and
turning off the first switching element when the differential voltage is equal to or lower than the second reference voltage.

* * * * *